(12) United States Patent
Kim et al.

(10) Patent No.: US 9,182,543 B2
(45) Date of Patent: Nov. 10, 2015

(54) OPTICAL INTEGRATED CIRCUITS, SEMICONDUCTOR DEVICES INCLUDING THE SAME, AND METHODS OF MANUFACTURING THE SAME

(71) Applicant: Samsung Electronics Co., Ltd., Suwon-Si, Gyeonggi-Do (KR)

(72) Inventors: Seong-Gu Kim, Pyeongtaek-si (KR); Dong-Jae Shin, Seoul (KR); Yong-Hwack Shin, Incheon (KR); Young Choi, Seoul (KR); Kyoung-Ho Ha, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 188 days.

(21) Appl. No.: 13/826,471

(22) Filed: Mar. 14, 2013

(65) Prior Publication Data

US 2013/0343696 A1 Dec. 26, 2013

(30) Foreign Application Priority Data

Jun. 26, 2012 (KR) .................. 10-2012-0068377

(51) Int. Cl.
*G02B 6/12* (2006.01)
*G02F 1/225* (2006.01)
*G02F 1/21* (2006.01)

(52) U.S. Cl.
CPC .............. *G02B 6/12* (2013.01); *G02B 6/12004* (2013.01); *G02F 1/2257* (2013.01); *G02F 2001/212* (2013.01); *G02F 2201/063* (2013.01); *G02F 2201/066* (2013.01); *G02F 2202/105* (2013.01)

(58) Field of Classification Search
None
See application file for complete search history.

(56) References Cited

U.S. PATENT DOCUMENTS

| | | | | |
|---|---|---|---|---|
| 4,114,257 | A * | 9/1978 | Bellavance | 438/24 |
| 4,762,382 | A * | 8/1988 | Husain et al. | 385/132 |
| 5,371,817 | A * | 12/1994 | Revelli et al. | 385/44 |
| 7,805,037 | B1 * | 9/2010 | Van Der Vliet et al. | 385/43 |
| 8,260,094 | B2 * | 9/2012 | Evans et al. | 385/14 |
| 8,842,946 | B1 * | 9/2014 | Liao et al. | 385/14 |
| 2002/0031307 | A1 * | 3/2002 | Kimura | 385/49 |
| 2002/0159683 | A1 * | 10/2002 | Helin et al. | 385/18 |
| 2003/0091290 | A1 * | 5/2003 | Whitehead | 385/50 |
| 2007/0003183 | A1 * | 1/2007 | Shiba et al. | 385/14 |
| 2007/0086692 | A1 | 4/2007 | Dagens et al. | |
| 2008/0315342 | A1 | 12/2008 | Basu et al. | |
| 2010/0074577 | A1 * | 3/2010 | Yang et al. | 385/17 |
| 2011/0150386 | A1 | 6/2011 | Dupuis et al. | |
| 2011/0194803 | A1 | 8/2011 | Shin et al. | |
| 2012/0288228 | A1 * | 11/2012 | Saito et al. | 385/14 |
| 2013/0170784 | A1 * | 7/2013 | Kim et al. | 385/3 |

FOREIGN PATENT DOCUMENTS

| | | | | |
|---|---|---|---|---|
| KR | | 1015406 A | 7/2010 | |
| KR | | 20110092044 A | 8/2011 | |
| WO | WO 2011/092861 A1 * | | 8/2011 | ............. G02B 6/122 |

* cited by examiner

*Primary Examiner* — Mike Stahl
(74) *Attorney, Agent, or Firm* — Harness, Dickey & Pierce, PLC

(57) ABSTRACT

An optical integrated circuit may include a substrate including a single crystalline semiconductor material, a passive element extending in a <100> crystal orientation of the substrate and including the single crystalline semiconductor material, and an active element extending in a <110> crystal orientation of the substrate and including the single crystalline semiconductor material.

19 Claims, 34 Drawing Sheets

OPTICAL INTEGRATED CIRCUITS, SEMICONDUCTOR DEVICES INCLUDING THE SAME, AND METHODS OF MANUFACTURING THE SAME

CROSS-REFERENCE TO RELATED APPLICATION(S)

This application claims priority under 35 USC §119 to Korean Patent Application No. 10-2012-0068377, filed on Jun. 26, 2012, in the Korean Intellectual Property Office (KIPO), the contents of which are herein incorporated by reference in their entirety.

BACKGROUND

1. Field

Some example embodiments may relate to optical integrated circuits, semiconductor devices including the same, and/or methods of manufacturing the same.

2. Description of Related Art

As the enhancement of the speed of data transfer through electrical integrated circuits approaches physical limits, improved methods of transferring data through optical integrated circuits have been developed. If optical integrated circuits are formed on a silicon on insulator (SOI) substrate, the production cost increases due to the high price of the SOI substrate. Thus, methods of manufacturing optical integrated circuits on bulk silicon substrates have been studied. In order to form optical integrated circuits on bulk silicon substrates, processes for forming an amorphous silicon layer and crystallizing it are performed, and each portion of the optical integrated circuits may have characteristics according to the degree of crystallization of silicon.

SUMMARY

Some example embodiments may provide optical integrated circuits having good characteristics.

Some example embodiments may provide semiconductor devices including the optical integrated circuits.

Some example embodiments may provide methods of manufacturing optical integrated circuits having good characteristics.

Some example embodiments may provide methods of manufacturing semiconductor devices including the optical integrated circuits.

In some example embodiments, an optical integrated circuit may comprise a substrate including a single crystalline semiconductor material; a passive element extending in a <100> crystal orientation of the substrate and including the single crystalline semiconductor material; and/or an active element extending in a <110> crystal orientation of the substrate and including the single crystalline semiconductor material.

In some example embodiments, the passive element may include an optical waveguide. The active element may include a phase shifter connected to the optical waveguide.

In some example embodiments, the optical waveguide may include a first core including the single crystalline semiconductor material and extending in the <100> crystal orientation of the substrate, and/or a first cladding having a refractive index lower than that of the first core and surrounding the first core. The phase shifter may include a second core, including the single crystalline semiconductor material and extending in the <110> crystal orientation, connected to the first core; a second cladding having a refractive index lower than that of the second core and surrounding the second core; and/or an electrode electrically connected to the second core.

In some example embodiments, the passive element may further include an optical coupler connected to the optical waveguide.

In some example embodiments, the optical waveguide may include first and second waveguides. The first waveguide may be connected to the phase shifter.

In some example embodiments, the substrate may be a (100) silicon wafer or a (110) silicon wafer.

In some example embodiments, an optical integrated circuit may comprise a substrate including a single crystalline semiconductor material; a passive element extending on the substrate in a first direction parallel to a top surface of the substrate; and/or an active element extending on the substrate in a second direction making an acute angle with the first direction.

In some example embodiments, the first direction may be parallel to a <100> crystal orientation of the substrate. The second direction may be parallel to a <110> crystal orientation of the substrate.

In some example embodiments, the passive element may include an optical waveguide, including a first core including the single crystalline semiconductor material and extending in the first direction, and/or a first cladding having a refractive index lower than that of the first core and surrounding the first core. The active element may include a phase shifter, including a second core, including the single crystalline semiconductor material and extending in the second direction, connected to the first core; a second cladding having a refractive index lower than that of the second core and surrounding the second core; and/or an electrode electrically connected to the second core.

In some example embodiments, an optical integrated circuit may comprise an optical waveguide, including a first core including a first single crystalline semiconductor material; and/or a first cladding having a refractive index lower than that of the first core and surrounding the first core; and/or a phase shifter, including a second core, including a second single crystalline semiconductor material, connected to the first core, the second single crystalline semiconductor material having an amount of crystal defect more than that of the first single crystalline semiconductor material; a second cladding having a refractive index lower than that of the second core and surrounding the second core; and/or an electrode electrically connected to the second core.

In some example embodiments, an extension direction of the first core and an extension direction of the second core may make an angle of about 45° or about 135°.

In some example embodiments, a semiconductor device may comprise a substrate including a single crystalline semiconductor material; an optical integrated circuit, including a passive element extending in a <100> crystal orientation of the substrate and including the single crystalline semiconductor material; and/or an active element extending in a <110> crystal orientation of the substrate and including the single crystalline semiconductor material; and/or an electrical integrated circuit, including a gate structure extending in the <110> crystal orientation of the substrate; and/or source and drain regions before and after the gate structure, respectively, in a direction substantially perpendicular to an extension direction of the gate structure.

In some example embodiments, the passive element may include an optical waveguide. The active element may include a phase shifter connected to the optical waveguide.

In some example embodiments, a method of manufacturing an optical integrated circuit may comprise forming a passive element on a substrate including a single crystalline semiconductor material, the passive element including the single crystalline semiconductor material and extending in a <100> crystal orientation of the substrate; and/or forming an active element on the substrate, the active element including the single crystalline semiconductor material and extending in a <110> crystal orientation of the substrate.

In some example embodiments, forming the passive element may include forming an optical waveguide. Forming the active element may include forming a phase shifter connected to the optical waveguide.

In some example embodiments, an optical integrated circuit may comprise a substrate having a <100> crystal orientation and a <110> crystal orientation; a passive element extending in the <100> crystal orientation and including a single crystalline semiconductor material; and/or an active element extending in the <110> crystal orientation and including the single crystalline semiconductor material.

In some example embodiments, the passive element may include an optical waveguide.

In some example embodiments, the passive element may include an optical coupler.

In some example embodiments, the passive element may include an interferometer.

In some example embodiments, the active element may include a phase shifter.

In some example embodiments, the passive element may include an optical waveguide. The passive element may further include an optical coupler connected to the optical waveguide.

In some example embodiments, the passive element may include an optical waveguide. The active element may include a phase shifter connected to the optical waveguide.

In some example embodiments, the passive element may include an optical waveguide. The passive element may further include an optical coupler connected to the optical waveguide. The active element may include a phase shifter connected to the optical waveguide.

In some example embodiments, the passive element may include a first optical waveguide, a second optical waveguide, and a first coupler. The first optical waveguide, second optical waveguide, and first coupler may meet at an interferometer.

In some example embodiments, the passive element may include a first optical waveguide, a second optical waveguide, and a first coupler. The active element may include a phase shifter connected to the optical waveguide. The first optical waveguide, second optical waveguide, and first coupler may meet at an interferometer.

In some example embodiments, the passive element may include a first optical waveguide, a second optical waveguide, a first coupler, and a second coupler. The first optical waveguide, second optical waveguide, and first coupler may meet at a first interferometer. The first optical waveguide, second optical waveguide, and second coupler may meet at a second interferometer.

In some example embodiments, the passive element may include a first optical waveguide, a second optical waveguide, a first coupler, and a second coupler. The active element may include a phase shifter connected to the first optical waveguide. The first optical waveguide, second optical waveguide, and first coupler may meet at a first interferometer. The first optical waveguide, second optical waveguide, and second coupler may meet at a second interferometer.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF THE EMBODIMENTS

Figure 1:
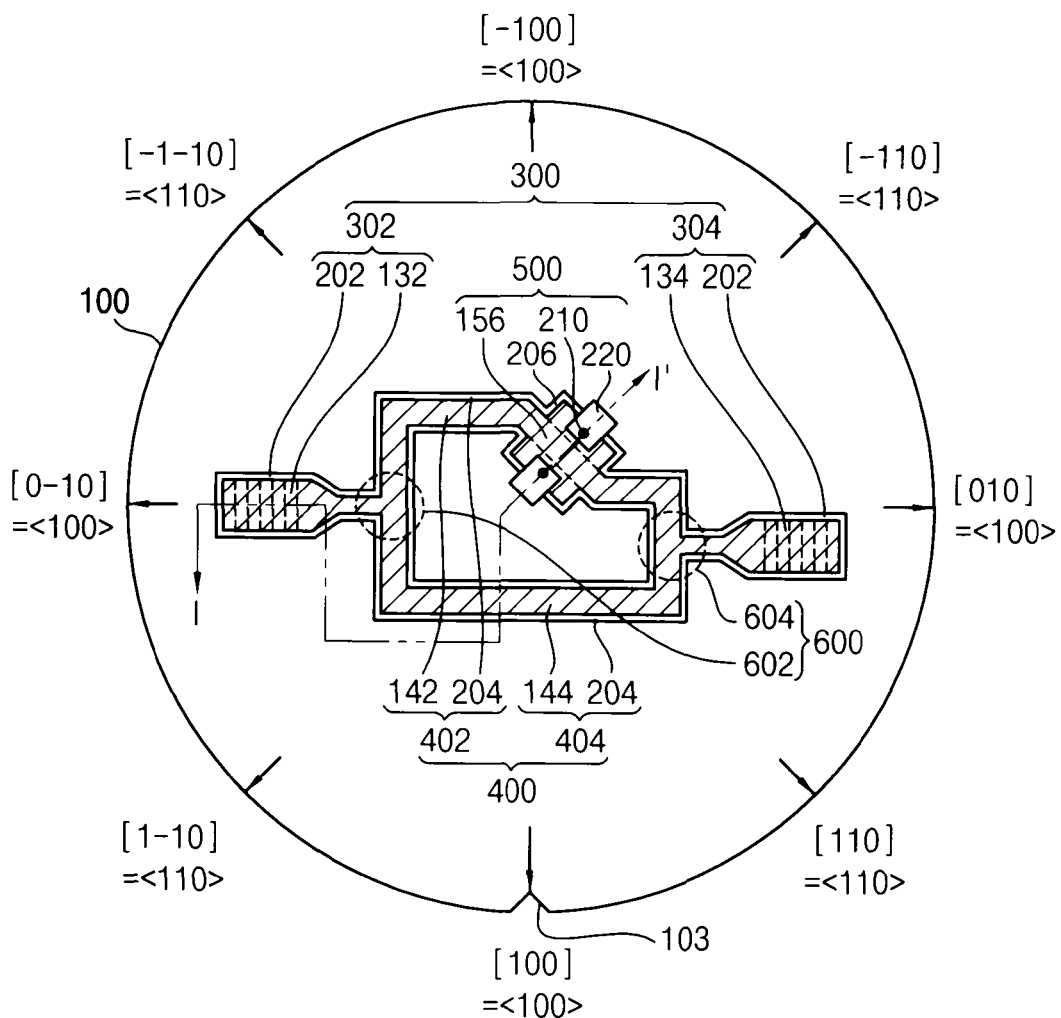
FIG. 1 is a plan view illustrating an optical integrated circuit in accordance with some example embodiments.
Figure 1:
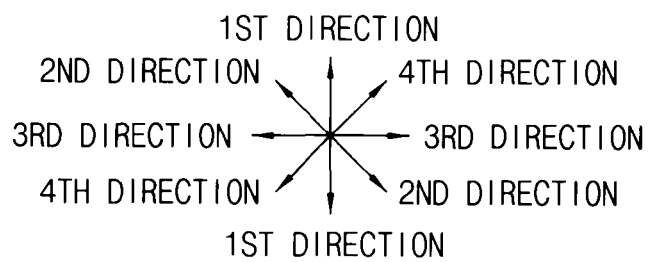

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that tends, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 2:
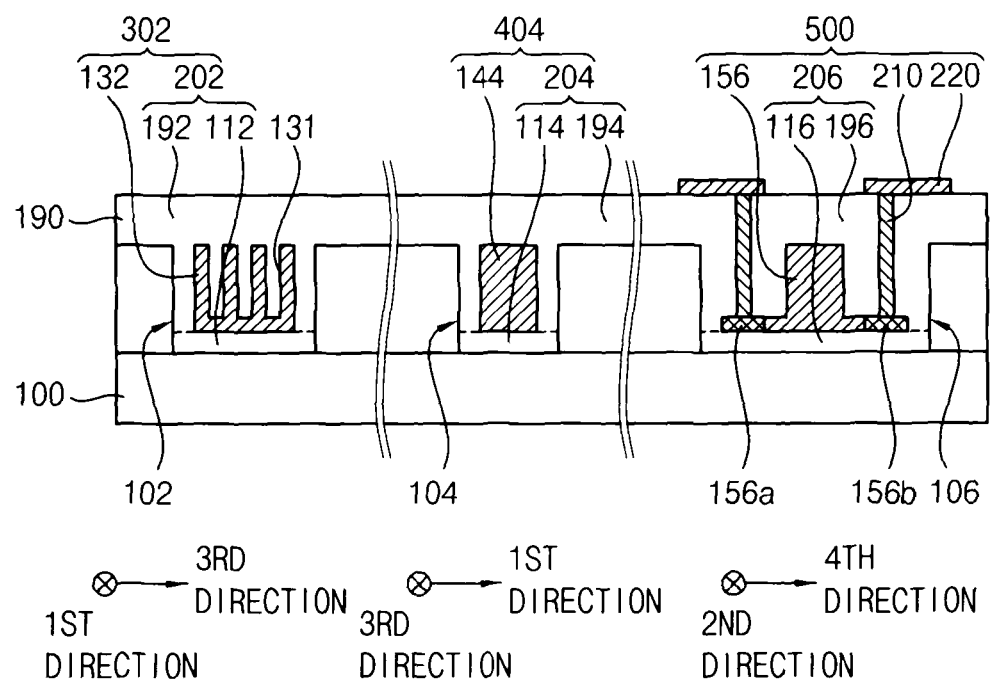
FIG. 2 is a cross-sectional view of the optical integrated circuit cut along the line I-I' of FIG. 1.

FIG. 1 is a plan view illustrating an optical integrated circuit in accordance with some example embodiments, and FIG. 2 is a cross-sectional view of the optical integrated circuit cut along the line I-I' of FIG. 1. For the convenience of explanation, a second insulation layer 190, i.e., fourth to sixth insulation layer patterns 192, 194 and 196 are not shown in FIG. 1.

Referring to FIGS. 1 and 2, the optical integrated circuit may include a passive element on a first substrate 100, and an active element that may be provided with a power from the outside. In some example embodiments, the passive element may include an optical coupler 300 and an optical waveguide 400, and the active element may include a phase shifter 500.

The first substrate 100 may include a semiconductor material, e.g., silicon, germanium, etc. In some example embodiments, the first substrate 100 may be a single crystalline silicon wafer.

According to the crystal orientation of silicon included in the first substrate 100, first to fourth directions may be defined on the first substrate 100. That is, a direction substantially parallel to the [100] crystal orientation may be defined as the first direction, a direction substantially parallel to the [110] crystal orientation may be defined as the second direction, a direction substantially parallel to the [010] crystal orientation may be defined as the third direction, and a direction substantially parallel to the [−110] crystal orientation may be defined as the fourth direction. Additionally, a direction substantially parallel to the [−100] crystal orientation may be defined as the first direction, a direction substantially parallel to the [−1-10] crystal orientation may be defined as the second direction, a direction substantially parallel to the [0-10] crystal orientation may be defined as the third direction, and a direction substantially parallel to the [1-10] crystal orientation may be defined as the fourth direction.

All of the [100] crystal orientation, the [010] crystal orientation, the [−100] crystal orientation and the [0-10] crystal orientation may be defined as <100> crystal orientation, and all of the [110] crystal orientation, the [−110] crystal orientation, the [4-10] crystal orientation and the [1-10] crystal orientation may be defined as <110> crystal orientation. Thus, the first and third directions may be substantially parallel to the <100> crystal orientation, and the second and fourth directions may be substantially parallel to the <110> direction.

The above directions defined in FIGS. 1 and 2 may be applied to all figures hereinafter.

A first notch 103 may be formed at an edge of the first substrate 100 in the [100] crystal orientation.

The optical coupler 300 may include a first coupler 302 and a second coupler 304. An optical signal input through the first coupler 302 may be output through the second coupler 304.

The optical coupler 300 may include first and second cores 132 and 134 and a first cladding 202. Particularly, the first coupler 302 may include the first core 132 and the first cladding 202 surrounding the first core 132, and the second coupler 304 may include the second core 134 and the first cladding 202 surrounding the second core 134.

The first and second cores 132 and 134 may include a single crystalline semiconductor material. In some example embodiments, the first and second cores 132 and 134 may include single crystalline silicon that has regrown from amorphous silicon with the {100} crystal plane of the first substrate 100 as a seed. The single crystalline silicon may have a small amount of crystal defect, and thus may have good crystalline characteristics.

In some example embodiments, the first and second cores 132 and 134 may extend in the third direction on the first substrate 100. That is, the first and second cores 132 and 134 may partially fill an upper portion of a first trench 102 extending in the third direction with a given distance on the first substrate 100, and thus may extend in the third direction with the given distance. In some example embodiments, each of the first and second cores 132 and 134 may have a plurality of recesses 131 extending in the first direction at an upper surface thereof. Thus, a plurality of concave and convex portions may be arranged in the third direction at an upper portion of each of the first and second cores 132 and 134.

The first cladding 202 may include a first insulation layer pattern 112 and a fourth insulation layer pattern 192. The first and fourth insulation layer patterns 112 and 192 may include an insulating material having a refractive index lower than that of the first and second cores 132 and 134. For example, the first and fourth insulation layer patterns 112 and 192 may include silicon oxide, silicon nitride, silicon carbonitride, etc. In some example embodiments, the first and fourth insulation layer patterns 112 and 192 may include substantially the same material.

As the first and second cores 132 and 134 extend in the third direction, the first cladding 202 surrounding the first and second cores 132 and 134 may extend in the third direction with a given distance. The first insulation layer pattern 112 may fill a lower portion of the first trench 102, and thus bottom surfaces of the first and second cores 132 and 134 may be covered by the first insulation layer pattern 112. The fourth insulation layer pattern 192 may fill lateral portions of the first trench 102 and be formed on the first and second cores 132 and 134 and on the first substrate 100. Thus, sidewalls and top surfaces of the first and second cores 132 and 134 may be covered by the fourth insulation layer pattern 192.

The optical waveguide 400 may include first waveguide 402 and a second waveguide 404. That is, a first portion of light having passed through the first coupler 302 may move through the first waveguide 402, and a second portion of the light may move through the second waveguide 404. The first portion of the light may pass through the phase shifter 500, and the second portion of the light may be directly incident on the second coupler 304.

The optical waveguide 400 may include third and fourth cores 142 and 144 and a second cladding 204. Particularly, the first waveguide 402 may include the third core 142 and the second cladding 204 surrounding the third core 142, and the second waveguide 404 may include the fourth core 144 and the second cladding 204 surrounding the fourth core 144.

The third and fourth cores 142 and 144 may include a single crystalline semiconductor material. In some example embodiments, the third and fourth cores 142 and 144 may include single crystalline silicon that has regrown from amorphous silicon with the {100} crystal plane of the first substrate 100 as a seed. The single crystalline silicon may have a small amount of crystal defect, and thus may have good crystalline characteristics.

In some example embodiments, the third and fourth cores 142 and 144 may extend in the third direction with a first given distance and also in the first direction with a second given distance on the first substrate 100. That is, the third and fourth cores 142 and 144 may partially fill an upper portion of a second trench 104 extending in the third direction with the first given distance and also in the first direction with the second given distance on the first substrate 100, and thus may extend in the third and first directions with first and second given distances, respectively.

The second cladding 204 may include a second insulation layer pattern 114 and a fifth insulation layer pattern 194. The second and fifth insulation layer patterns 114 and 194 may include an insulating material having a refractive index lower than that of the third and fourth cores 142 and 144. For example, the second and fifth insulation layer patterns 114 and 194 may include silicon oxide, silicon nitride, silicon carbonitride, etc. In some example embodiments, the second and fifth insulation layer patterns 114 and 194 may include substantially the same material as each other, and also substantially the same material as the first and fourth insulation layer patterns 112 and 192.

As the third and fourth cores 142 and 144 extend both in the third and first directions, the second cladding 204 surrounding the third and fourth cores 142 and 144 may extend both in the third and first directions. The second insulation layer pattern 114 may fill a lower portion of the second trench 104, and thus bottom surfaces of the third and fourth cores 142 and 144 may be covered by the second insulation layer pattern 114. The fifth insulation layer pattern 194 may fill lateral portions of the second trench 104 and be formed on the third and fourth cores 142 and 144 and on the first substrate 100. Thus, sidewalls and top surfaces of the third and fourth cores 142 and 144 may be covered by the fifth insulation layer pattern 194.

The phase shifter 500 may be connected to the first waveguide 402. In some example embodiments, the phase shifter 500 may be interposed at a middle portion of the first waveguide 402. Thus, a phase of the first portion of the light having passed through the first waveguide 402 may be changed while passing through the phase shifter 500, and may be incident on the second coupler 304 through the first waveguide 402.

The phase shifter 500 may include a fifth core 156, a third cladding 206, electrodes 220 and plugs 210.

The fifth core 156 may include a single crystalline semiconductor material. In some example embodiments, the fifth core 156 may include single crystalline silicon that has regrown from amorphous silicon with the {110} crystal plane of the first substrate 100 as a seed. The single crystalline silicon of the fifth core 156 may have an amount of defect larger than that of the first to fourth cores 132, 134, 142 and 144.

In some example embodiments, the fifth core 156 may extend in the second direction with a given distance on the first substrate 100. That is, the fifth core 156 may partially fill an upper portion of a third trench 106 extending in the second direction with a given distance on the first substrate 100, and thus may extend in the second direction with the given distance.

In some example embodiments, the fifth core 156 may include a central portion and lateral portions when viewed from the second direction, and the lateral portions may have a thickness smaller than that of the central portion. In some example embodiments, the lateral portions may be formed at both sides of a lower portion of the central portion. In some example embodiments, first and second impurity regions 156a and 156b may be formed in the lateral portions, respectively. Thus, the first and second impurity regions 156a and 156b may be formed at both lateral lower portions of the fifth core 156. The first and second impurity regions 156a and 156b may include p-type impurities, e.g., boron, gallium, etc., and n-type impurities, e.g., phosphorous, arsenic, etc., respectively.

The third cladding 206 may include a third insulation layer pattern 116 and a sixth insulation layer pattern 196. The third and sixth insulation layer patterns 116 and 196 may include an insulating material having a refractive index lower than that of the fifth core 156. For example, the third and sixth insulation layer patterns 116 and 196 may include silicon oxide, silicon nitride, silicon carbonitride, etc. In some example embodiments, the third and sixth insulation layer patterns 116 and 196 may include substantially the same material as each other, and also substantially the same material as the first, second, fourth and fifth insulation layer patterns 112, 114, 192 and 194.

As the fifth core 156 extends in the second direction, the third cladding 206 surrounding the fifth core 156 may extend in the second direction with a given distance. The third insulation layer pattern 116 may fill a lower portion of the third trench 106, and thus bottom surface of the fifth core 156 may be covered by the third insulation layer pattern 116. The sixth insulation layer pattern 196 may fill lateral portions of the third trench 106 and be formed on the fifth core 156 and on the first substrate 100. Thus, sidewalls and a top surface of the fifth core 156 may be covered by the sixth insulation layer pattern 196.

The electrodes 220 may be formed on the sixth insulation layer pattern 196, and be electrically connected to the first and second impurity regions 156a and 156b via the plugs 210 through the sixth insulation layer pattern 196. A voltage may be applied by the electrodes 220 to move electrons between the first and second impurity regions 156a and 156b, and thus the phase of the light passing through the central portion of the fifth core 156 may be changed.

Each of the electrodes 220 and the plugs 210 may include doped polysilicon, metal, metal nitride and/or metal silicide.

A portion in which the first coupler 302, the first waveguide 402 and the second waveguide 404 meet may be defined as a first interferometer 602, and a portion in which the second coupler 304, the first waveguide 402 and the second waveguide 404 meet may be defined as a second interferometer 604. The first and second interferometers 602 and 604 may form an optical interferometer 600.

A light incident on the first coupler 302 may be divided into two portions, e.g., first and second portions when it passes through the first interferometer 602, and the first and second portions of the light may move through the first and second waveguides 402 and 404, respectively. The first portion of the light moving through the first waveguide 402 may pass through the phase shifter 500, and thus the phase thereof may be changed, however, the second portion of the light moving through the second waveguide 404 may maintain its phase. The first and second portions of the light having passed through the first and second waveguides 402 and 404 may meet at the second interferometer 604, and interference may occur therebetween. The interfered light may be transfer by the second coupler 304 to the outside.

The passive element of the optical integrated circuit, i.e., the optical coupler 300 and the optical waveguide 400 may include a single crystalline semiconductor material, e.g., single crystalline silicon, grown in the <100> crystal orientation, and thus may have less crystal defect and good crystalline characteristics. Thus, the passive element may have relatively less loss in the optical signal transfer. The active element of the optical integrated circuit, e.g., the phase shifter 500 may include a single crystalline semiconductor material, e.g., single crystalline silicon, grown in the <110> crystal orientation, and thus may have a relatively more crystal defect. Thus, the lifetime of electrons input into the phase shifter 500 by the electrodes 220 may be short, and the active element may be relatively faster in the optical signal transfer.

In FIGS. 1 and 2, each passive element extends in the third direction (or in the first direction) and each active element extends in the second direction, and thus an angle of 45° or 135° may be formed between the passive and active elements. However, the extension direction thereof may not be limited thereto, and any angle that is not parallel or perpendicular to each other, e.g., any acute angle may be formed therebetween.

That is, when the first and second trenches 102 and 104 for forming the passive element are formed to extend in the third direction or in the first direction substantially parallel to the <100> crystal orientation, the third trench 106 for forming the active element may not be necessarily formed to extend in the second direction substantially parallel to the <110> crystal orientation, but may be formed to extend, e.g., in a fifth direction substantially parallel to the <130> crystal orientation. In this case, the angle between the extension direction of the passive element in the first and second trenches 102 and 104 and that of the active element in the third trench 106 may be 30° or 60°.

Thus, the passive element including single crystalline silicon having grown in the <100> crystal orientation with a portion of the first substrate 100 exposed by the first and second trenches 102 and 104 as a seed may have a relatively small amount of crystal defect, and the loss of the light signal passing through the passive element may be small. Additionally, the active element including single crystalline silicon having grown in the <130> crystal orientation with a portion of the first substrate 100 exposed by the third trench 106 as a seed may have a relatively large amount of crystal defect, and the speed of transferring the light signal may be high.

Further, the first and second trenches 102 and 104 for forming the passive element may not be necessarily formed to extend in the third direction or in the first direction parallel to the <100> crystal orientation. That is, if only the single crystalline silicon having grown in a first crystal orientation with a portion of the first substrate 100 exposed by the first and second trenches 102 and 104 as a seed has a crystal defect less than that of the single crystalline silicon having grown in a second crystal orientation with a portion of the first substrate 100 exposed by the third trench 106 as a seed, the passive element formed in the first and second trenches 102 and 104 may have a signal transfer loss less than that of the active element formed in the third trench 106, and the active element may have a signal transfer speed higher than that of the passive element, according to some example embodiments.

That is, according to some example embodiments, the single crystalline semiconductor material included in the passive element may have a crystalline defect less than that of the single crystalline semiconductor material included in the active element. Thus, according to some example embodiments, the angle between the extension direction of the passive element and the extension direction of the active element may be preferably 45° or 135°. However, the angle may not be limited thereto, and some example embodiments may include any angle that is not perpendicular or parallel to each other.

FIGS. 1 and 2 exemplarily show a Mach Zehnder optical shifter, however, the present inventive concept may be applied to various types of optical integrated circuits including the passive element and active element.

FIGS. 3, 5, 7, 9, 11, 13, 15 and 17 are plan views illustrating stages of a method of manufacturing an optical integrated circuit, and FIGS. 4, 6, 8, 10, 12, 14 and 16 are cross-sectional views of the optical integrated circuit. FIGS. 4, 6, 8, 10, 12, 14 and 16 are cross-sectional views cut along the line I-I' of FIGS. 3, 5, 7, 9, 11, 13 and 15, respectively. This method may be used in manufacturing the optical integrated circuit of FIGS. 1 and 2, however, may not be limited thereto.

Figure 3:
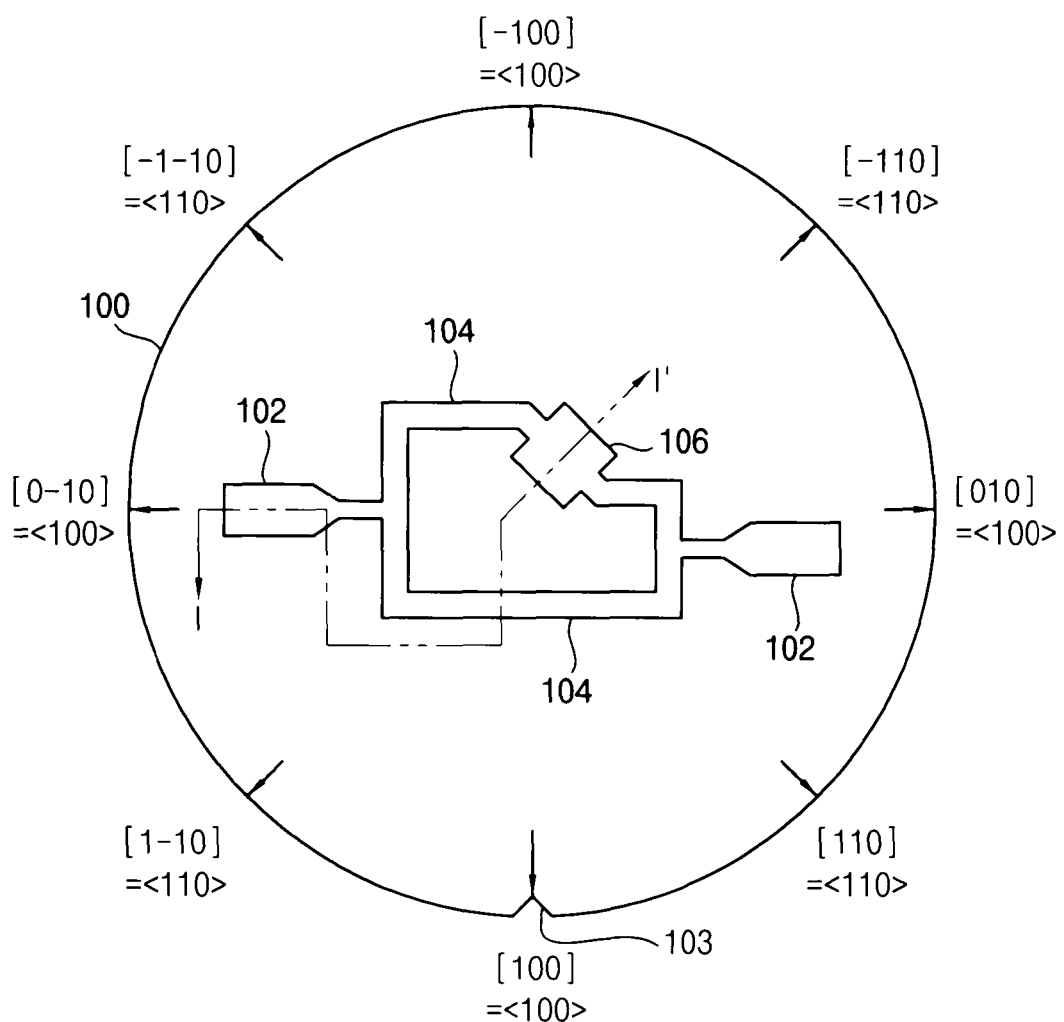
FIGS. 3, 5, 7, 9, 11, 13, 15 and 17 are plan views illustrating stages of a method of manufacturing an optical integrated circuit.
Figure 3:
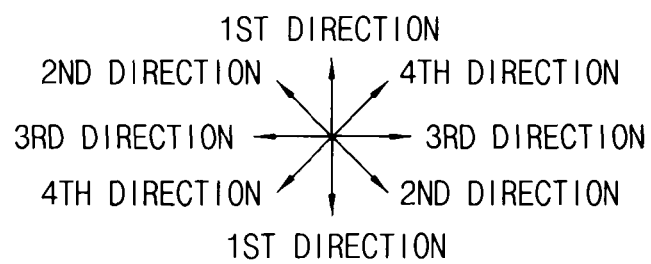
Figure 4:
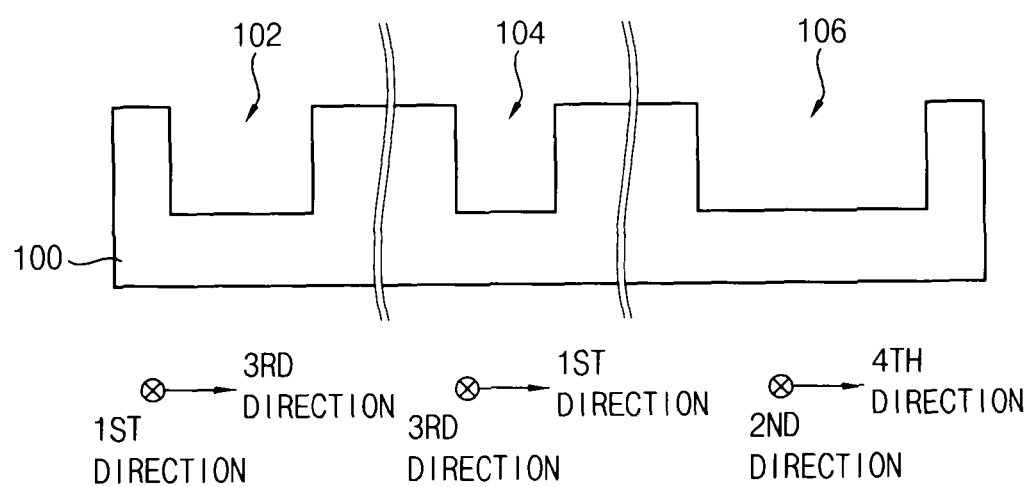
FIGS. 4, 6, 8, 10, 12, 14 and 16 are cross-sectional views of the optical integrated circuit.

Referring to FIGS. 3 and 4, first, second and third trenches 102, 104 and 106 may be formed on a first substrate 100.

The first substrate 100 may include a semiconductor material, e.g., silicon, germanium, etc. In some example embodiments, the first substrate 100 may be a single crystalline silicon wafer.

In some example embodiments, the first, second and third trenches 102, 104 and 106 may be formed by a dry etching process using a first photoresist pattern (not shown) as an etching mask. The first trench 102 may be formed to extend in the third direction with a first distance, the second trench 104 may be formed to extend in the third and first directions with second and third distances, respectively, and the third trench 106 may be formed to extend in the second direction with a fourth distance. Thus, the {100} crystal plane, the {100} crystal plane and the {110} crystal plane of the first substrate 100 may be exposed by the first, second and third trenches 102, 104 and 106, respectively.

In some example embodiments, two first trenches 102 may be formed to be in fluid communication with the second trench 104 at both end portions of the second trench 104. The second trench 104 may be formed to be divided into two, and the two second trenches 104 may extend in the third and first directions, respectively. One of the two second trenches 104 may be in fluid communication with the third trench 106. In some example embodiments, the third trench 106 may be interposed at a central portion of the second trench 104.

Figure 5:
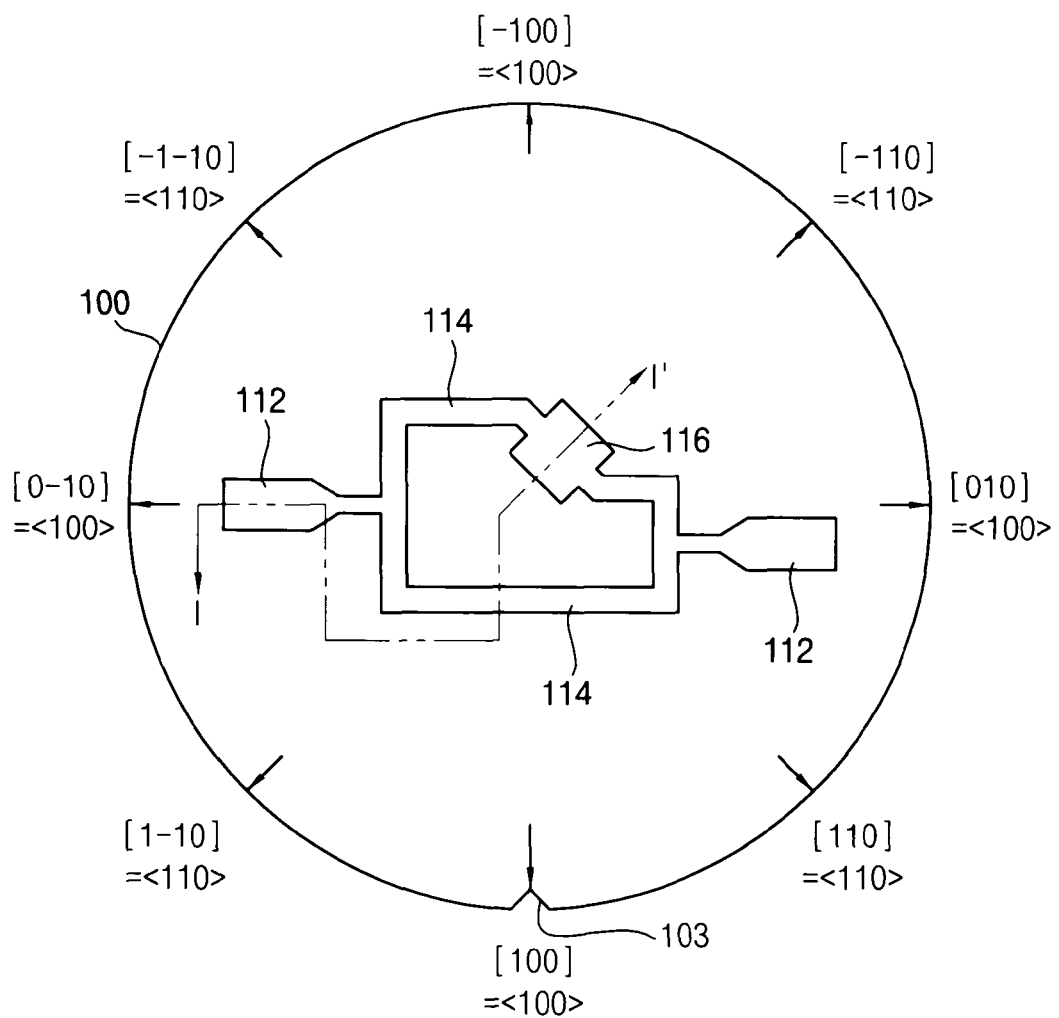
Figure 6:
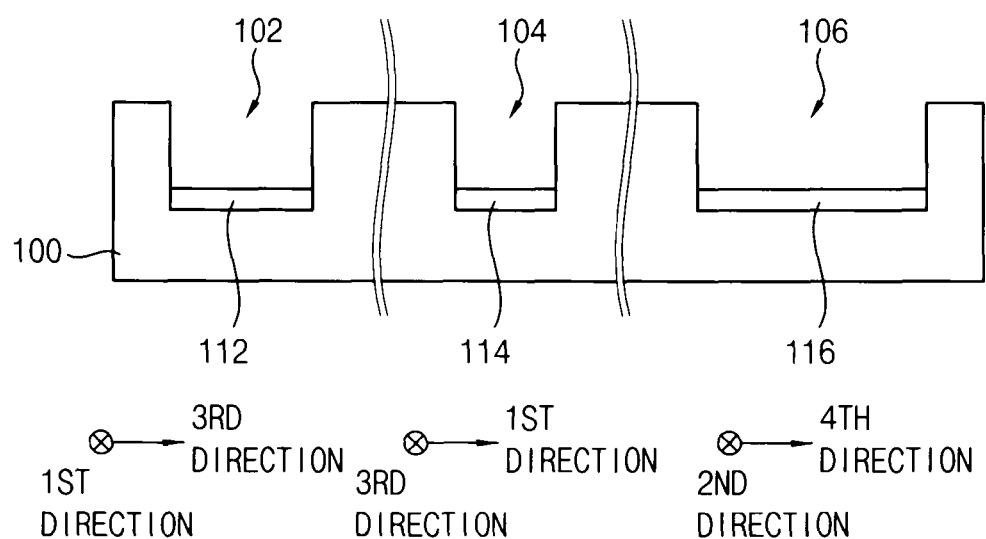

Referring to FIGS. 5 and 6, first, second and third insulation layer patterns 112, 114 and 116 may be formed at lower portions of the first, second and third trenches 102, 104 and 106, respectively.

In some example embodiments, a first insulation layer may be formed on the first substrate 100 to fill the first, second and third trenches 102, 104 and 106, the first insulation layer may be planarized until a top surface of the first substrate 100 may be exposed, and portions of the first insulation layer at upper portions of the first, second and third trenches 102, 104 and 106 may be removed to form the first, second and third insulation layer patterns 112, 114 and 116, respectively. In some example embodiments, the planarization process may be performed by a chemical mechanical polishing (CMP) process and/or an etch back process. The portions of the first insulation layer at the upper portions of the first, second and third trenches 102, 104 and 106 may be removed by an etch back process.

The first insulation layer may be formed by a chemical vapor deposition (CVD) process, an atomic layer deposition (ALD) process, a physical vapor deposition (PVD) process, etc., to include, e.g., silicon oxide, silicon nitride, silicon carbonitride, etc.

According to extension directions of the first, second and third trenches 102, 104 and 106, the first insulation layer pattern 112 may be formed to extend in the third direction, the second insulation layer pattern 114 may be formed to extend in the third and first directions, and the third insulation layer pattern 116 may be formed to extend in the second direction.

Figure 7:
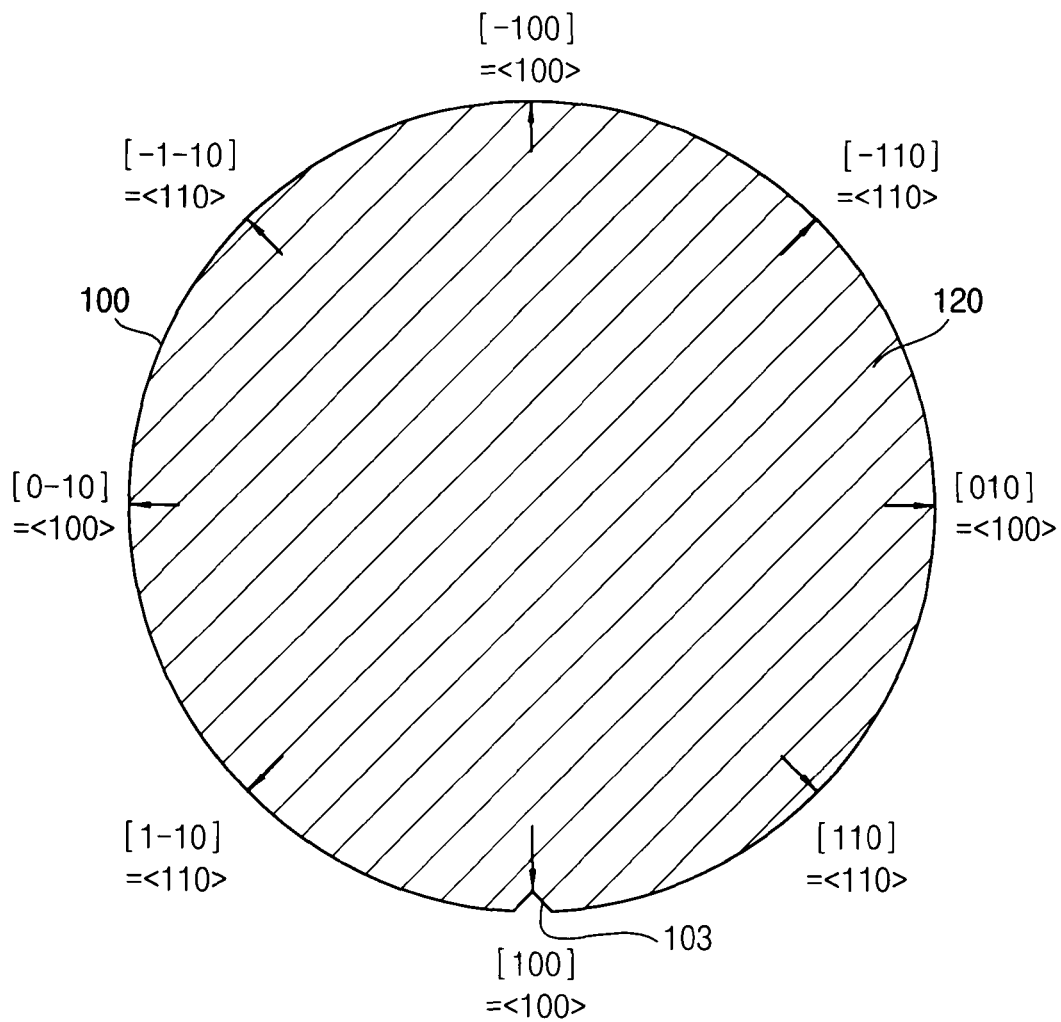
Figure 7:
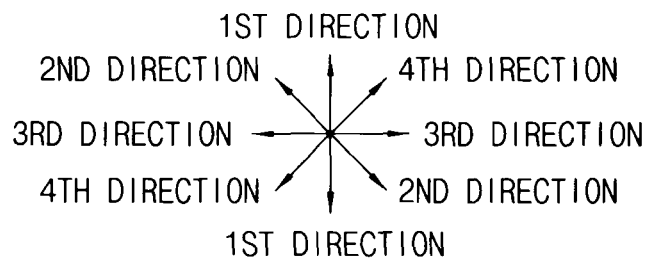
Figure 8:
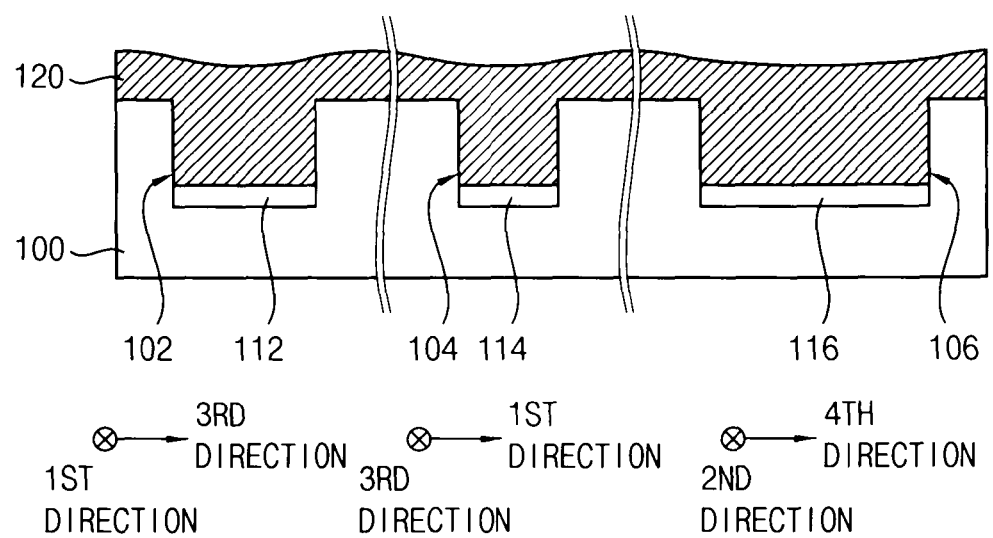

Referring to FIGS. 7 and 8, an amorphous semiconductor layer 120 may be formed on the first, second and third insulation layer patterns 112, 114 and 116 and the first substrate 100 to sufficiently fill remaining portions of the first, second and third trenches 102, 104 and 106.

The amorphous semiconductor layer 120 may be formed using a semiconductor material, e.g., silicon, germanium, etc. In some example embodiments, the amorphous semiconductor layer 120 may be formed using silicon by a CVD process, an ALD process, a PVD process, etc.

Figure 9:
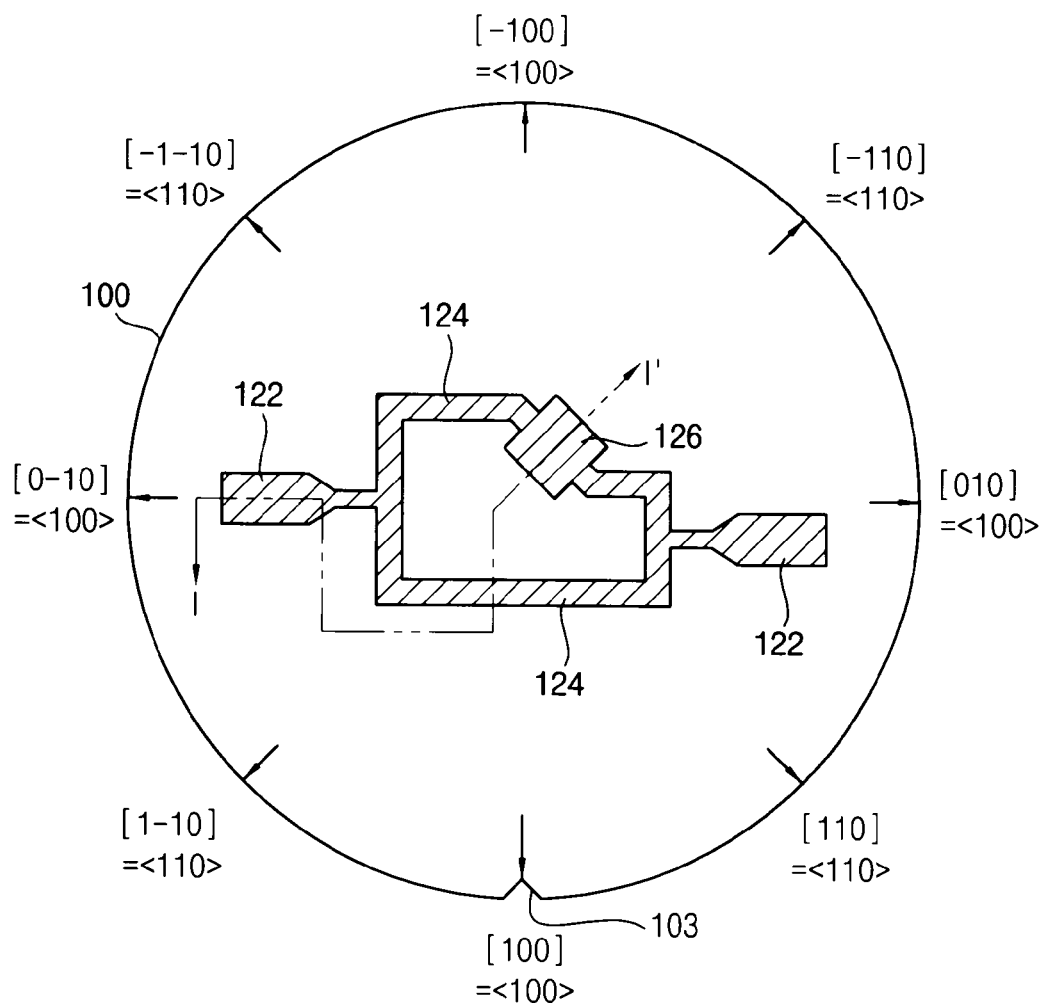
Figure 9:
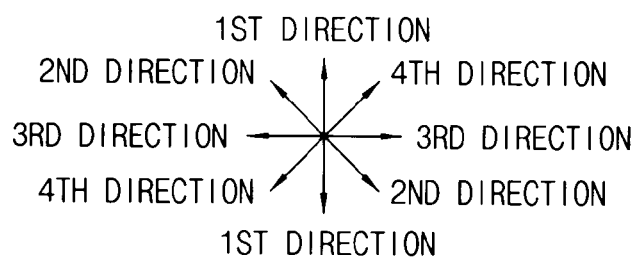
Figure 10:
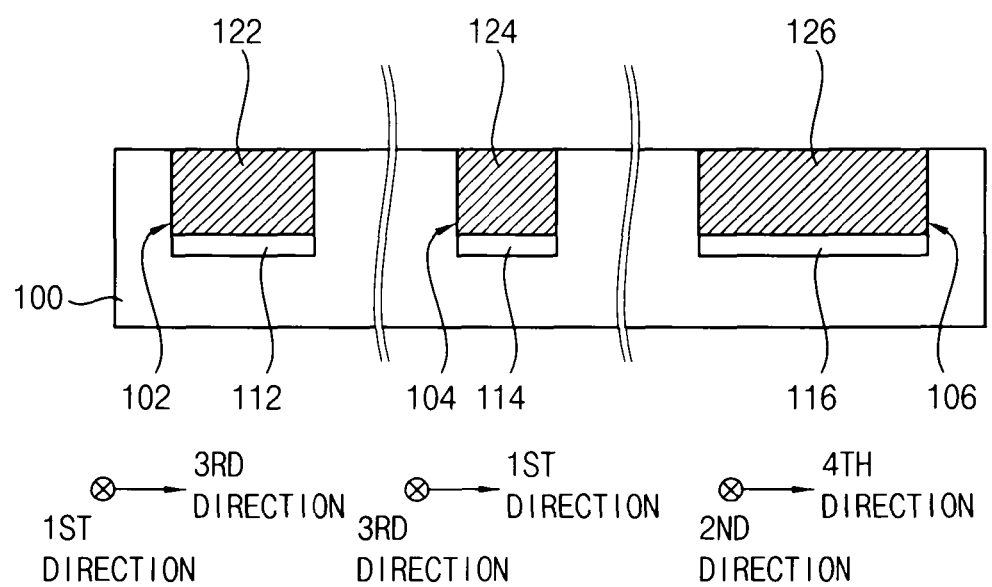

Referring to FIGS. 9 and 10, the amorphous semiconductor layer 120 may be crystallized using portions of the first substrate 100 exposed by the first, second and third trenches 102, 104 and 106 as a seed to form a single crystalline semiconductor layer, and the single crystalline semiconductor layer may be planarized until a top surface of the first substrate 100 may be exposed. Thus, first, second and third single crystalline semiconductor layer patterns 122, 124 and 126 may be formed at upper portions of the first, second and third trenches 102, 104 and 106, respectively.

According to the extension directions of the first, second and third trenches 102, 104 and 106, the first single crystalline semiconductor layer pattern 122 may be formed to extend in the third direction, the second single crystalline semiconductor layer pattern 124 may be formed to extend in the third and first directions, and the third single crystalline semiconductor layer pattern 126 may be formed to extend in the second direction.

The single crystalline semiconductor layer may be formed by heating the amorphous semiconductor layer 120 or by emitting a laser thereon. In some example embodiments, the crystallization process may be performed by a solid phase epitaxy (SPE) process, a laser epitaxial growth (LEG) process, etc.

In some example embodiments, the {100} crystal plane, the {100} crystal plane and the {110} crystal plane of the first substrate 100 may be exposed by the first, second and third trenches 102, 104 and 106, respectively, and the first, second and third single crystalline semiconductor layer patterns 122, 124 and 126 that may be formed by a crystallization process using the exposed crystal planes as a seed may regrow in the <100> crystal orientation, the <100> crystal orientation and the <110> crystal orientation, respectively. The regrowth speed of the semiconductor material in the <100> crystal orientation may be higher than that of the semiconductor material in the <110> crystal orientation, and the crystal defect of the first and second single crystalline semiconductor layer patterns 122 and 124 having grown in the <100> crystal orientation may be less than that of the third single crystalline semiconductor layer pattern 126 having grown in the <110> crystal orientation.

Figure 11:
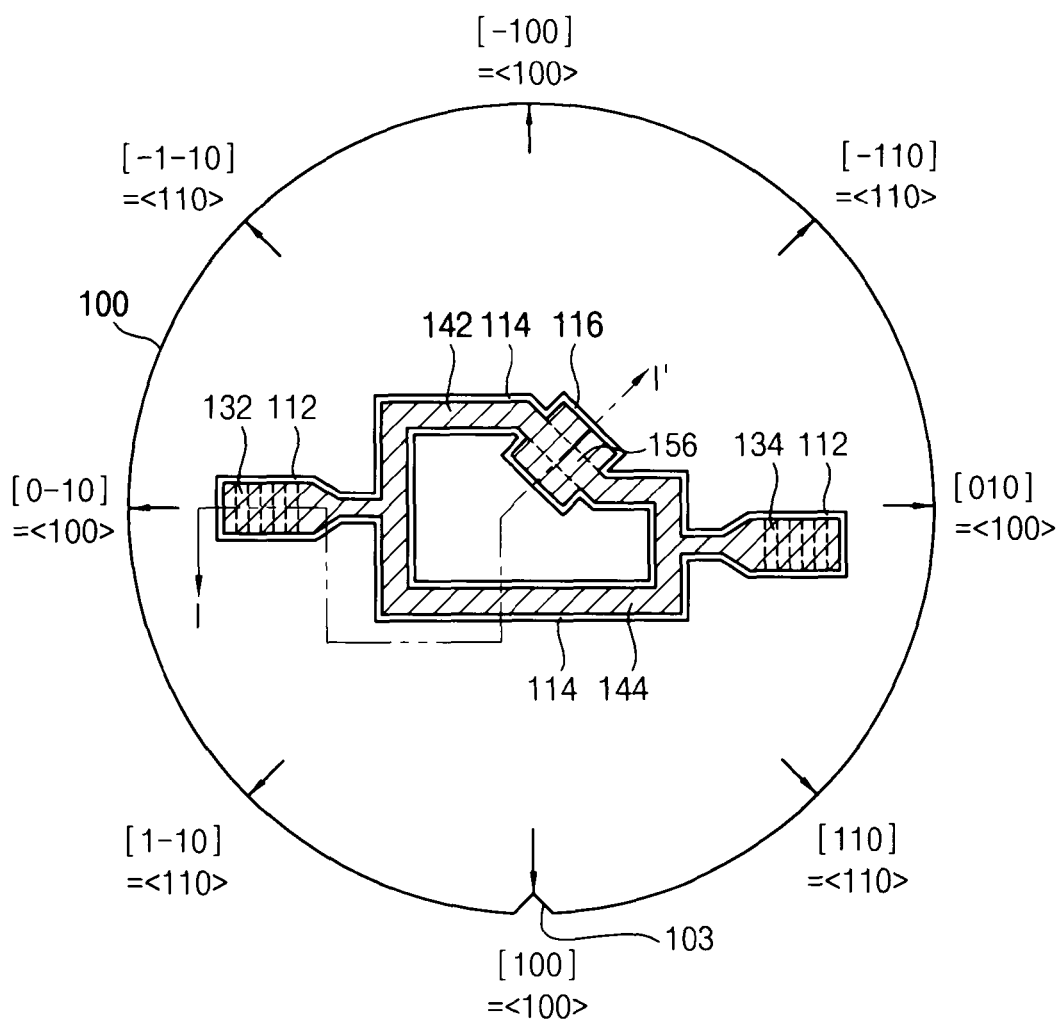
Figure 11:
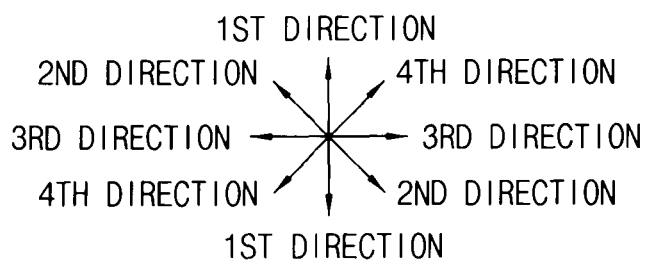
Figure 12:
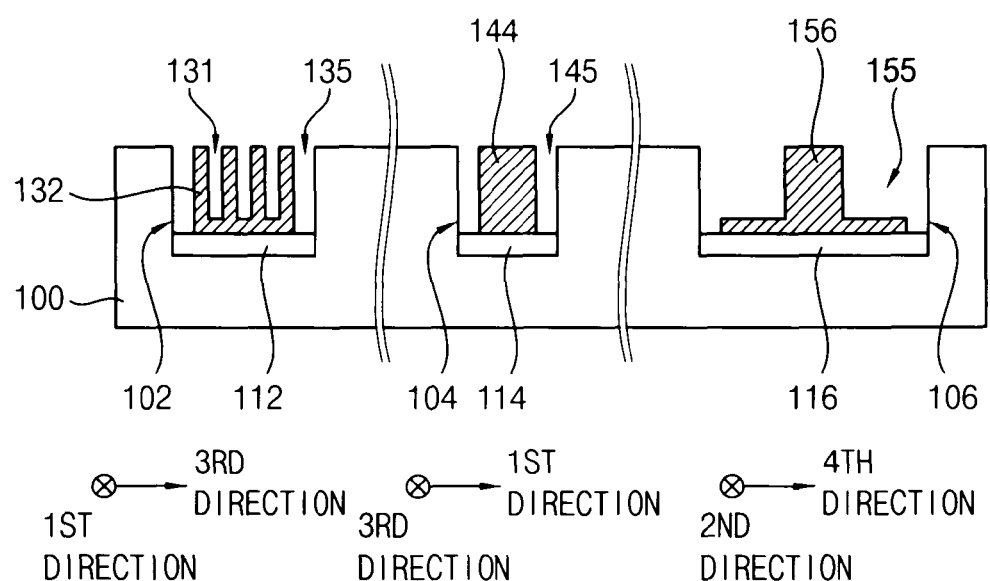

Referring to FIGS. 11 and 12, the first, second and third single crystalline semiconductor layer patterns 122, 124 and 126 may be partially etched to form first, second, third, fourth and fifth cores 132, 134, 142, 144 and 156.

In some example embodiments, the first, second and third single crystalline semiconductor layer patterns 122, 124 and 126 may be etched by a dry etching process using a second photoresist pattern (not shown) as an etching mask to form first, second and third openings 135, 145 and 155 exposing sidewalls of the first, second and third trenches 102, 104 and 106, and upper edge surfaces of the first, second and third insulation layer patterns 112, 114 and 116, respectively.

After removing the second photoresist pattern, the first and third single crystalline semiconductor layer patterns 122 and 126 may be partially etched by a dry etching process using a third photoresist pattern (not shown) as an etching mask to form recesses 131 on the first single crystalline semiconductor layer pattern 122 and to reduce thicknesses of lateral portions of the third single crystalline semiconductor layer pattern 126 when viewed in the second direction. In some example embodiments, each recess 131 may be formed to extend in the first direction, and a plurality of recesses 131 may be formed in the third direction. A space formed by removing the lateral portions of the third single crystalline semiconductor layer pattern 126 may be in fluid communication with the third opening 155, and the space and the third opening 155 may be defined totally as the third opening 155, hereinafter.

Alternatively, after performing the dry etching process using the third photoresist pattern, the dry etching process using the second photoresist pattern may be performed.

After the above dry etching processes, the first single crystalline semiconductor layer pattern 122 remaining in the first trench 102 may be defined as first and second cores 132 and 134, the second single crystalline semiconductor layer pattern 124 remaining in the second trench 104 may be defined as third and fourth cores 142 and 144, and the third single crystalline semiconductor layer pattern 126 remaining in the third trench 106 may be defined as a fifth core 156.

The first and second cores 132 and 134 may extend in the third direction substantially parallel to the <100> crystal orientation, the third and fourth cores 142 and 144 may extend in the third and first directions substantially parallel to the <100> crystal orientation, and the fifth core 156 may extend in the second direction substantially parallel to the <110> crystal orientation.

Figure 13:
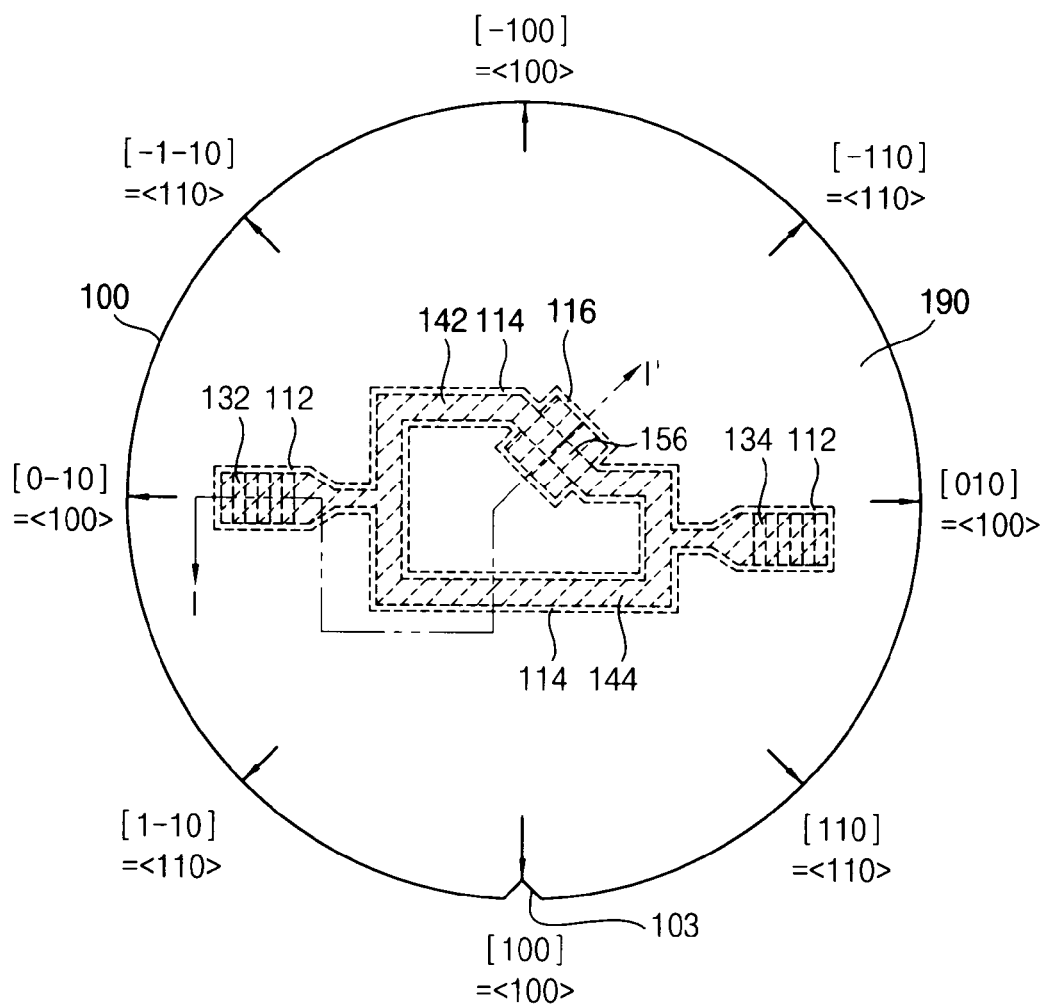
Figure 13:
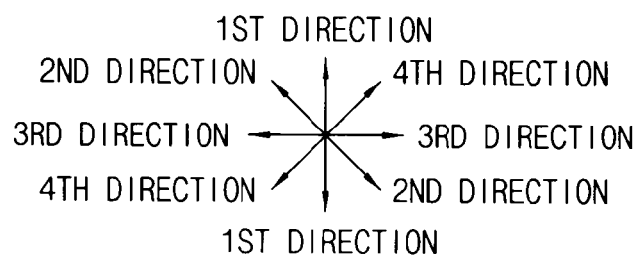
Figure 14:
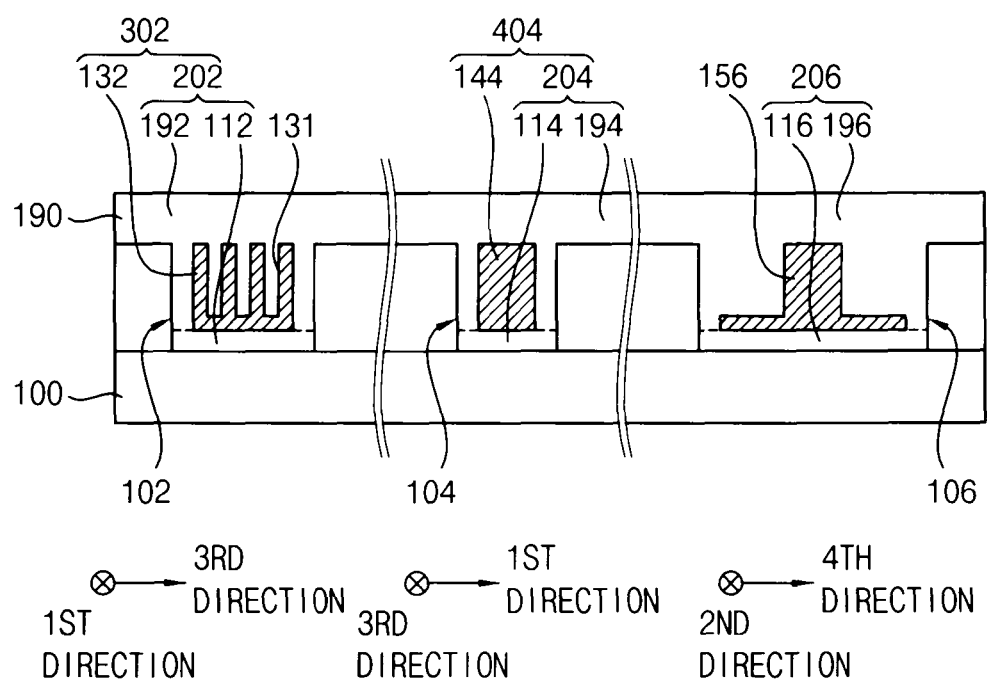

Referring to FIGS. 13 and 14, a second insulation layer 190 may be formed on the first, second and third insulation layer patterns 112, 114 and 116, the first to fifth cores 132, 134, 142, 144 and 156 and the first substrate 100 to sufficiently fill the recesses 131 and remaining portions of the first, second and third openings 135, 145 and 155.

The second insulation layer 190 may be formed using silicon oxide, silicon nitride, silicon carbonitride, etc., by a CVD process, an ALD process, a PVD process, etc. In some example embodiments, the second insulation layer 190 may be formed using a material substantially the same as that of the first insulation layer, and thus may be merged into the first, second and third insulation layer patterns 112, 114 and 116.

Hereinafter, a portion of the second insulation layer 190 on the first insulation layer pattern 112 may be defined as a fourth insulation layer pattern 192, and the first and fourth insulation layer patterns 112 and 192 may be defined as a first cladding 202. A portion of the second insulation layer 190 on the second insulation layer pattern 114 may be defined as a fifth insulation layer pattern 194, and the second and fifth insulation layer patterns 114 and 194 may be defined as a second cladding 204. A portion of the second insulation layer 190 on the third insulation layer pattern 116 may be defined as a sixth insulation layer pattern 196, and the third and sixth insulation layer patterns 116 and 196 may be defined as a third cladding 206.

The first core 132 and the first cladding 202 may define a first coupler 302, the second core 134 and the first cladding 202 may define a second coupler 304 (refer to FIG. 1), and the first and second couplers 302 and 304 may form an optical coupler 300 (refer to FIG. 1).

The third core 142 and the second cladding 204 may define a first waveguide 402 (refer to FIG. 1), the fourth core 144 and the second cladding 204 may define a second waveguide 404, and the first and second waveguides 402 and 404 may form an optical waveguide 400 (refer to FIG. 1).

Figure 15:
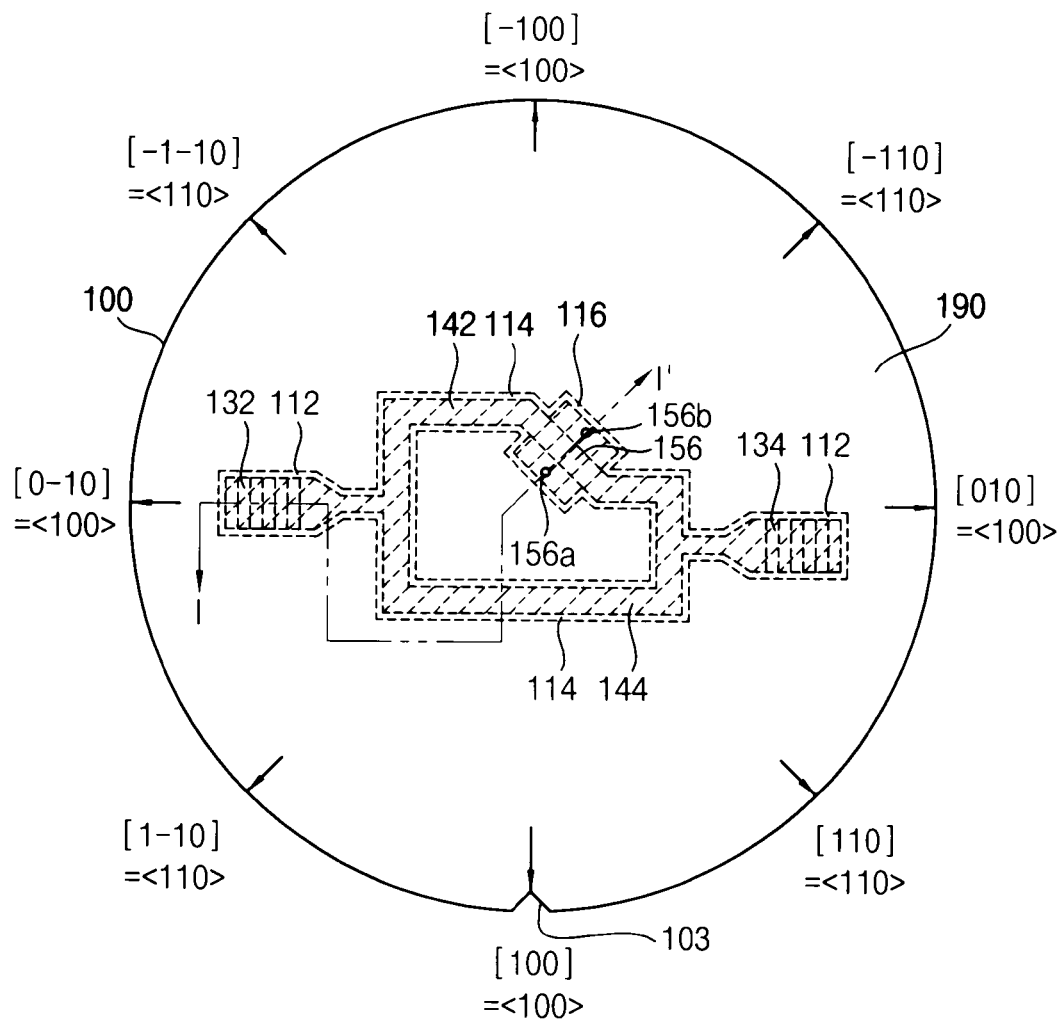
Figure 16:
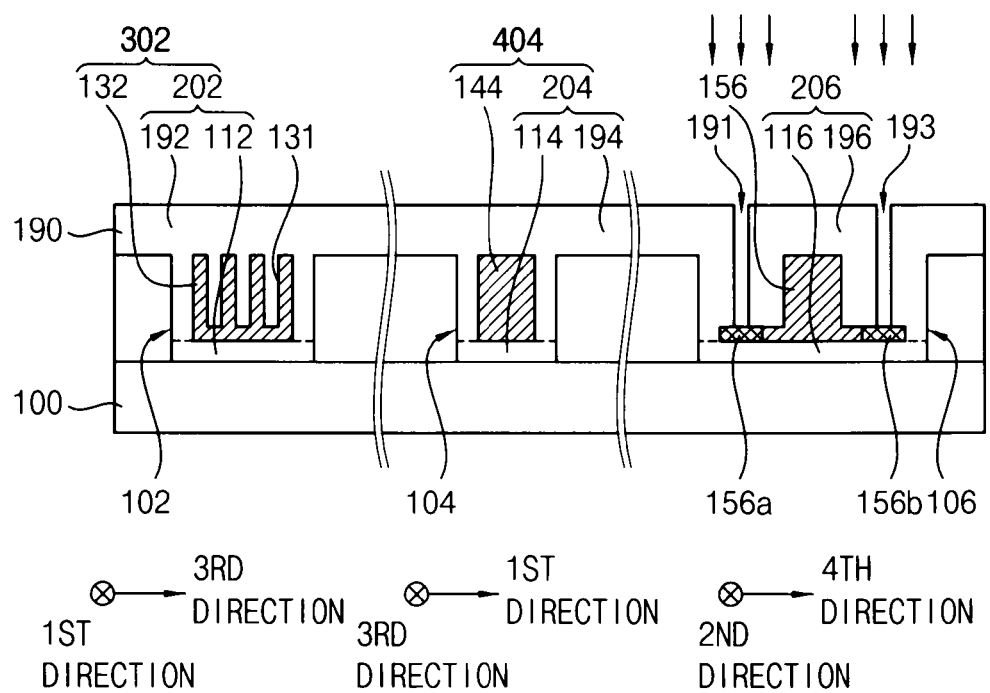

Referring to FIGS. 15 and 16, the sixth insulation layer pattern 196 may be partially removed to form fourth and fifth openings 191 and 193 exposing the fifth core 156.

In some example embodiments, the fourth and fifth openings 191 and 193 may be formed to have an island shape from each other, and expose top surfaces of the lateral portions of the fifth core 156 of which thicknesses have been reduced.

Impurities may be implanted into the lateral portions of the fifth core 156 exposed by the fourth and fifth openings 191 and 193 to form first and second impurity regions 156a and 156b, respectively. In some example embodiments, the first and second impurity regions 156a and 156b may be formed by an ion implantation process.

In some example embodiments, p-type impurities. e.g., boron, gallium. etc. may be implanted through the fourth opening 191, and n-type impurities, e.g., phosphorous, arsenic, etc. may be implanted through the fifth opening 193. Thus, the first impurity region 156a may be doped with p-type impurities, and the second impurity region 156b may be doped with n-type impurities.

Figure 17:
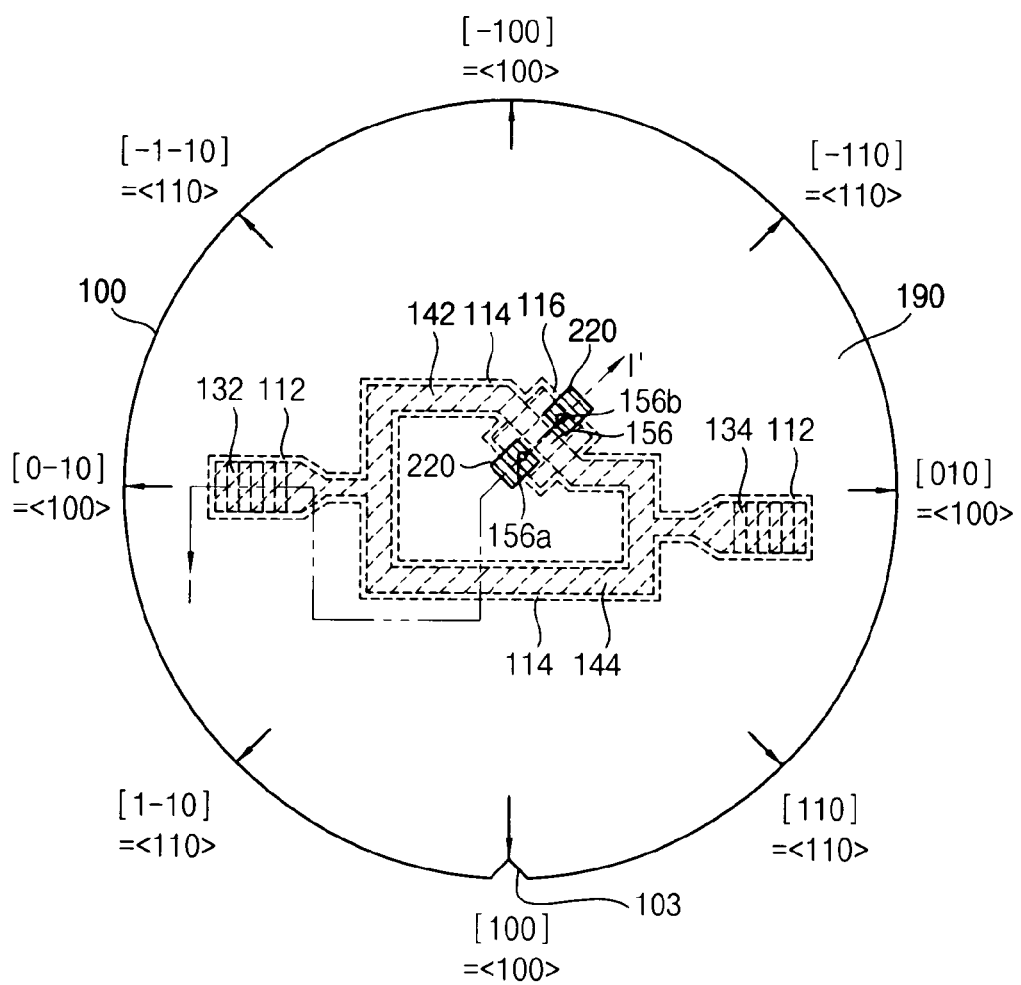
Figure 17:
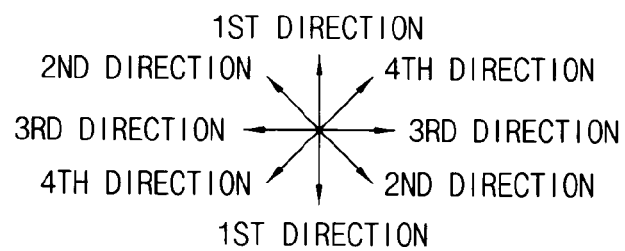

Referring to FIGS. 17 and 2, plugs 210 may be formed to fill the fourth and fifth openings 191 and 193, and electrodes 220 may be formed on the plugs 210.

In some example embodiments, the plugs 210 may be formed by forming a plug layer on the exposed lateral portions of the fifth core 156 and the second insulation layer 190 to sufficiently fill the fourth and fifth openings 191 and 193 and by planarizing the plug layer until a top surface of the second insulation layer 190 may be exposed. The plug layer may be formed to include, e.g., doped polysilicon, metal, metal nitride and/or metal silicide.

In some example embodiments, the electrodes 220 may be formed by forming an electrode layer on the plugs 210 and the second insulation layer 190, and by patterning the electrode layer to contact the plugs 210. The electrode layer may be formed to include, e.g., doped polysilicon, metal, metal nitride and/or metal silicide.

Accordingly, referring to FIGS. 1 and 2, a phase shifter 500 including the fifth core 156, the third cladding 206, the plugs 210 and the electrodes 220 may be formed.

By the above processes, the optical integrated circuit including the optical coupler 300, the optical waveguide 400 and the phase shifter 500 may be manufactured. A portion in which the optical coupler 300 and the optical waveguide 400 meet may be defined as an optical interferometer 600. Particularly, a portion in which the first coupler 302, the first waveguide 402 and the second waveguide 404 meet may be defined as a first interferometer 602, and a portion in which the second coupler 304, the first waveguide 402 and the second waveguide 404 meet may be defined as a second interferometer 604.

The passive element of the optical integrated circuit, i.e., the optical coupler 300 and the optical waveguide 400 may include a single crystalline semiconductor material having regrown in the <100> crystal orientation, e.g., single crystalline silicon, and thus may have a small amount of crystal defect and good crystal characteristics. Thus, the passive elements may have a small signal transfer loss. The active elements of the optical integrated circuit, i.e., the phase shifter 500 may include a single crystalline semiconductor material having regrown in the <110> crystal orientation, e.g., single crystalline silicon, and thus may have a large amount of crystal defect. Thus, the active element may have a high signal transfer speed.

Figure 18:
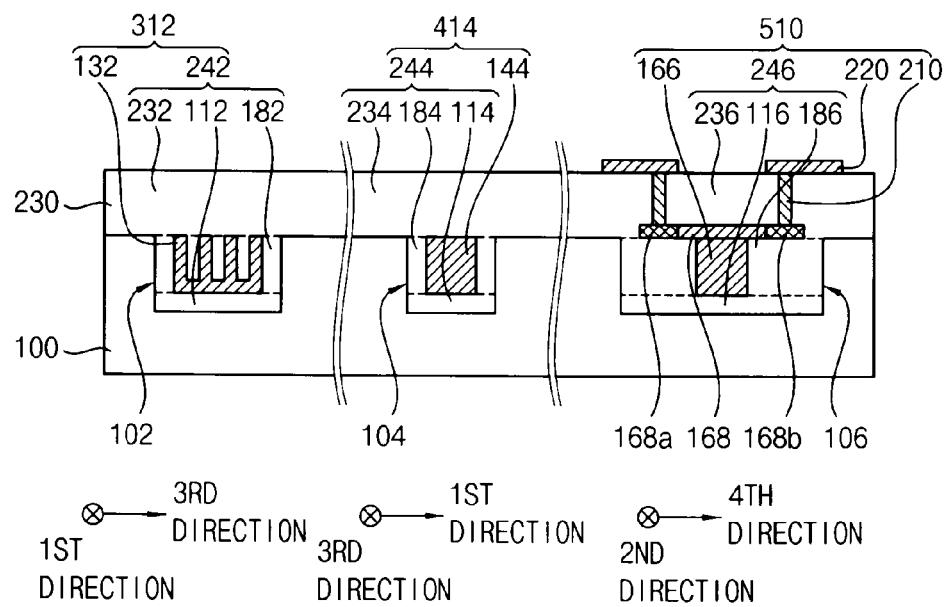
FIG. 18 is a cross-sectional view illustrating an optical integrated circuit in accordance with some example embodiments.

FIG. 18 is a cross-sectional view illustrating an optical integrated circuit in accordance with some example embodiments. The optical integrated circuit is substantially the same as or similar to that of FIGS. 1 and 2 except for the construction of the phase shifter and the cladding. Thus, like reference numerals refer to like elements, and detailed descriptions thereon are omitted herein.

Referring to FIG. 18, the optical integrated circuit may include an optical coupler, an optical waveguide, a phase shifter 510 and interferometer.

The optical coupler may include a third coupler 312 and a fourth coupler (not shown). The third coupler 312 may include a first core 132 and a fourth cladding 242.

The fourth cladding 242 may include a first insulation layer pattern 112, a seventh insulation layer pattern 182 and a tenth insulation layer pattern 232. The seventh insulation layer pattern 182 may be formed on the first insulation layer pattern 112, cover sidewalls of the first core 132, and fill the first recesses 131. The tenth insulation layer pattern 232 may be formed on the first core 132 and the seventh insulation layer pattern 182. The seventh and tenth insulation layer patterns 182 and 232 may include an insulating material, e.g., silicon oxide, silicon nitride, silicon carbonitride, etc. In some example embodiments, the seventh and tenth insulation layer patterns 182 and 232 may include a material substantially the same as that of the first insulation layer pattern 112.

The fourth coupler may have a structure substantially the same as or similar to that of the third coupler 312. However, the third coupler 312 may be connected to a first end portion of the optical waveguide, and the fourth coupler may be connected to a second end portion that is opposing the first end portion.

The optical waveguide may include a third waveguide (not shown) and a fourth waveguide 414. The fourth waveguide 414 may include a fourth core 144 and a fifth cladding 244.

The fifth cladding 244 may include a second insulation layer pattern 114, an eighth insulation layer pattern 184 and an eleventh insulation layer pattern 234. The eighth insulation layer pattern 184 may be formed on the second insulation layer pattern 114 and cover sidewalls of the fourth core 144. The eleventh insulation layer pattern 234 may be formed on the fourth core 144 and the eighth insulation layer pattern 184. The eighth and eleventh insulation layer patterns 184 and 234 may include an insulating material, e.g., silicon oxide, silicon nitride, silicon carbonitride, etc. In some example embodiments, the eighth and eleventh insulation layer patterns 184 and 234 may include a material substantially the same as that of the second insulation layer pattern 114.

The third waveguide may have a structure substantially the same as or similar to that of the fourth waveguide 414. However, the third waveguide may be connected to the phase shifter 510.

The phase shifter 510 may include a sixth core 166, a sixth cladding 246, a channel layer 168, plugs 210 and electrodes 220.

The sixth core 166 may have a constant thickness unlike the fifth core 156.

The sixth cladding 246 may include a third insulation layer pattern 116, a ninth insulation layer pattern 186 and a twelfth insulation layer pattern 236. The ninth insulation layer pattern 186 may be formed on the third insulation layer pattern 116 and cover lateral portions of the sixth core 166. The twelfth insulation layer pattern 236 may cover the sixth core 166 and the channel layer 168 on the ninth insulation layer pattern 186. The ninth and twelfth insulation layer patterns 186 and 236 may include an insulating material, e.g., silicon oxide, silicon nitride, silicon carbonitride, etc. In some example embodiments, the ninth and twelfth insulation layer patterns 186 and 236 may include a material substantially the same as that of the third insulation layer pattern 116.

The channel layer 168 may include a single crystalline semiconductor material, e.g., single crystalline silicon. Third and fourth impurity regions 168a and 168b may be formed at lateral portions of the channel layer 168 when viewed in the second direction. In some example embodiments, the third impurity region 168a may be doped with p-type impurities, e.g., born, gallium, etc., and the fourth impurity region 168b may be doped with n-type impurities, e.g., phosphorus, arsenic, etc.

The plugs 210 may be formed through the twelfth insulation layer pattern 236 to contact the third and fourth impurity regions 168a and 168b. The electrodes 220 may be formed on the twelfth insulation layer pattern 236 to contact top surfaces of the plugs 210.

The phase shifter 510 may include the channel layer 168 at an upper portion of the sixth core 166 through which the light signal may pass, unlike the phase shifter 500 of FIGS. 1 and 2, and the third and fourth impurity regions 168a and 168b beside the channel layer 168. According to the movement of electrons in the channel layer 168, the phase of the light signal moving through the sixth core 166 may be changed.

Figure 19:
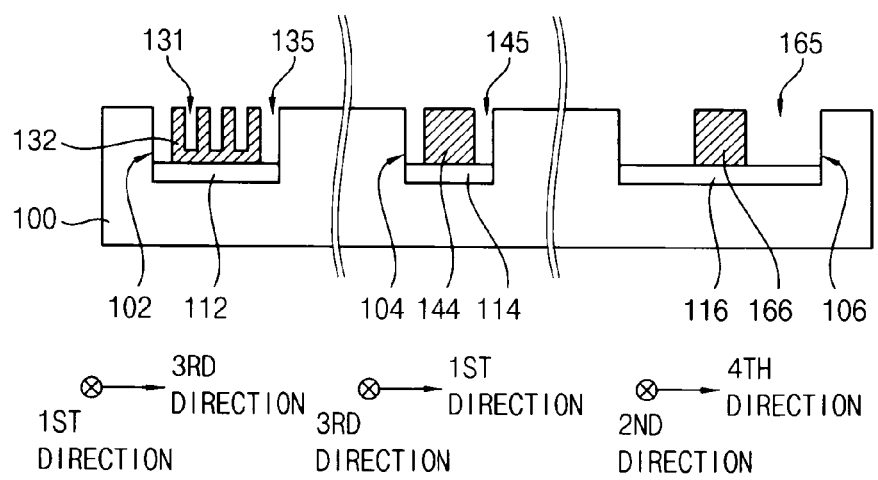
FIGS. 19 to 21 are cross-sectional views illustrating stages of a method of manufacturing an optical integrated circuit in accordance with some example embodiments.
Figure 20:
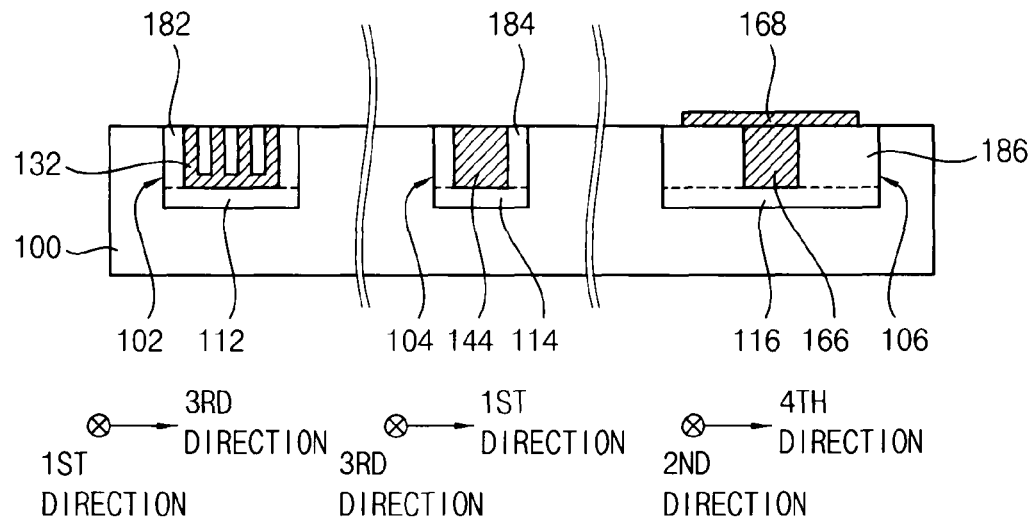
Figure 21:
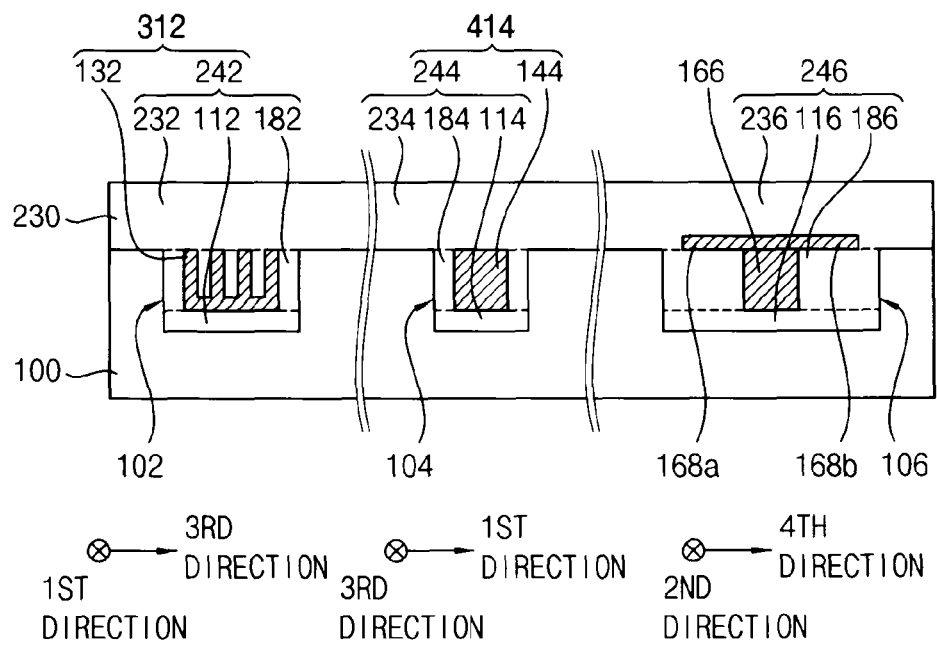

FIGS. 19 to 21 are cross-sectional views illustrating stages of a method of manufacturing an optical integrated circuit in accordance with some example embodiments. This method may be used in manufacturing the optical integrated circuit of FIG. 18, however, may not be limited thereto. Additionally, this method may include processes substantially the same as or similar to those illustrated with reference to FIGS. 3 to 17, and thus like reference numerals refer to like elements, and detailed descriptions thereon are omitted herein.

First, processes substantially the same as or similar to those illustrated with reference to FIGS. 3 to 10 may be performed.

Referring to FIG. 19, processes substantially the same as or similar to those illustrated with reference to FIGS. 11 to 12 may be performed. However, the third single crystalline semiconductor layer pattern 126 may be partially etched to form a sixth core 166.

Thus, a sixth opening 165 exposing sidewalls of the third trench 106 and upper edge surfaces of the third insulation layer pattern 116 may be formed, and the sixth core 166 may have a constant thickness unlike the fifth core 156. The sixth core 166 may be formed to extend in the second direction substantially parallel to the <110> crystal orientation.

Referring to FIG. 20, a third insulation layer sufficiently filling the first, second and sixth openings 135, 145 and 165 and the recesses 131 may be formed on the first, second and third insulation layer patterns 112, 114 and 116, the first, second, third, fourth and sixth cores 132, 134, 142, 144 and 166, and the first substrate 100, and the third insulation layer may be planarized until a top surface of the first substrate 100 may be exposed. Thus, seventh, eighth and ninth insulation layer patterns 182, 184 and 186 filling remaining portions of the first, second and third trenches 102, 104 and 106, respectively, may be formed.

The third insulation layer may be formed to include, e.g., silicon oxide, silicon nitride, silicon carbonitride, etc. In some example embodiments, the third insulation layer may be formed to include a material substantially the same as that of the first, second and third insulation layer patterns 112, 114 and 116.

A channel layer 168 may be formed on the ninth insulation layer pattern 186 to contact the sixth core 166. In some example embodiments, the channel layer 168 may be formed by forming an amorphous semiconductor layer or a poly-crystalline semiconductor layer on the first, second, third, fourth and sixth cores 132, 134, 142, 144 and 166, the seventh, eighth and ninth insulation layer patterns 182, 184 and 186 and the first substrate 100, by crystallizing the amorphous semiconductor layer or the poly-crystalline semiconductor layer, and by patterning the crystallized layer.

Referring to FIG. 21, a fourth insulation layer 230 covering the channel layer 168 may be formed on the first, second, third, fourth and sixth cores 132, 134, 142, 144 and 166, the seventh, eighth and ninth insulation layer patterns 182, 184 and 186 and the first substrate 100.

The fourth insulation layer 230 may be formed to include an insulating material, e.g., silicon oxide, silicon nitride, silicon carbonitride, etc. In some example embodiments, the fourth insulation layer 230 may be formed using a material substantially the same as that of the first, second and third insulation layer patterns 112, 114 and 116 and the seventh, eighth and ninth insulation layer patterns 182, 184 and 186.

A portion of the fourth insulation layer 230 on the seventh insulation layer pattern 182 may be defined as a tenth insulation layer pattern 232, a portion of the fourth insulation layer 230 on the eighth insulation layer pattern 184 may be defined as an eleventh insulation layer pattern 234, and a portion of the fourth insulation layer 230 on the ninth insulation layer pattern 186 may be defined as a twelfth insulation layer pattern 236. Thus, the first, seventh and tenth insulation layer patterns 112, 182 and 232 may form a fourth cladding 242, the second, eighth and eleventh insulation layer patterns 114, 184 and 234 may form a fifth cladding 244, and the third, ninth and twelfth insulation layer patterns 116, 186 and 236 may form a sixth cladding 246.

The first core 132 and the fourth cladding 242 may be defined as a third coupler 312, the second core 134 and the fourth cladding 242 may be defined as a fourth cladding (not shown), and the third coupler 312 and the fourth coupler may form an optical coupler.

The third core 142 and the fifth cladding 244 may be defined as a third waveguide (not shown), the fourth core 144 and the fifth cladding 244 may be defined as a fourth waveguide 414, and the third waveguide and the fourth waveguide 414 may form an optical waveguide.

Referring to FIG. 18 again, processes substantially the same as or similar to those illustrated with reference to FIGS. 15 to 17 and FIG. 2 may be performed.

That is, the twelfth insulation layer pattern 236 may be partially removed to form seventh and eighth openings (not shown) exposing lateral portions of the channel layer 168, and impurities may be implanted into the exposed lateral portions of the channel layer 168 to form third and fourth impurity regions 168a and 168b. In some example embodiments, p-type impurities, e.g., boron, gallium, etc. may be implanted through the seventh opening, and n-type impurities, e.g., phosphorous, arsenic, etc. may be implanted through the eighth opening. Thus, the third impurity region 168a may be doped with p-type impurities, and the fourth impurity region 168b may be doped with n-type impurities.

Plugs 210 filling the seventh and eighth openings may be formed, and electrodes 220 may be formed on the plugs 210. Thus, a phase shifter 510 including the sixth core 166, the sixth cladding 246, the channel layer 168, the plugs 210 and the electrodes 220 may be formed.

Figure 22:
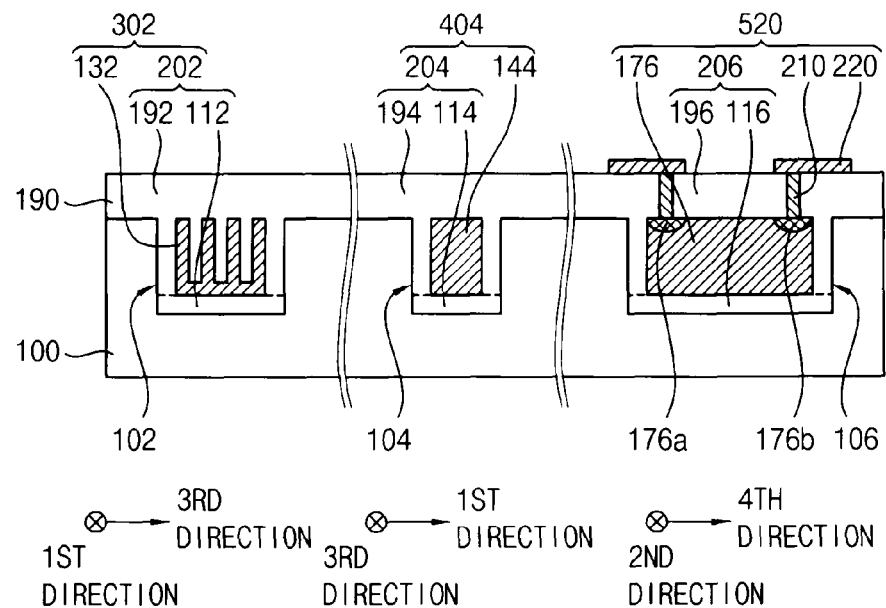
FIG. 22 is a cross-sectional view illustrating an optical integrated circuit in accordance with some example embodiments.

FIG. 22 is a cross-sectional view illustrating an optical integrated circuit in accordance with some example embodiments. The optical integrated circuit is substantially the same as or similar to that of FIGS. 1 and 2 except for the construction of the phase shifter and the cladding. Thus, like reference numerals refer to like elements, and detailed descriptions thereon are omitted herein.

Referring to FIG. 22, a phase shifter 520 of the optical integrated circuit may include a seventh core 176, a third cladding 206, plugs 210 and electrodes 220.

The seventh core 176 may have a constant thickness unlike the fifth core 156, and may have a width greater than that of the phase shifter 510 of the optical integrated circuit illustrated with reference to FIG. 18. Fifth and sixth impurity regions 176a and 176b may be formed at upper lateral portions of the seventh core 176 when viewed in the second direction. In some example embodiments, the fifth impurity region 176a may be doped with p-type impurities, e.g., born, gallium, etc., and the sixth impurity region 176b may be doped with n-type impurities, e.g., phosphorus, arsenic, etc.

The phase shifter 520 may include the fifth and sixth impurity regions 176a and 176b at the upper lateral portions of the seventh core 176 through which the light signal may pass, unlike the phase shifter 500 of FIGS. 1 and 2.

Figure 23:
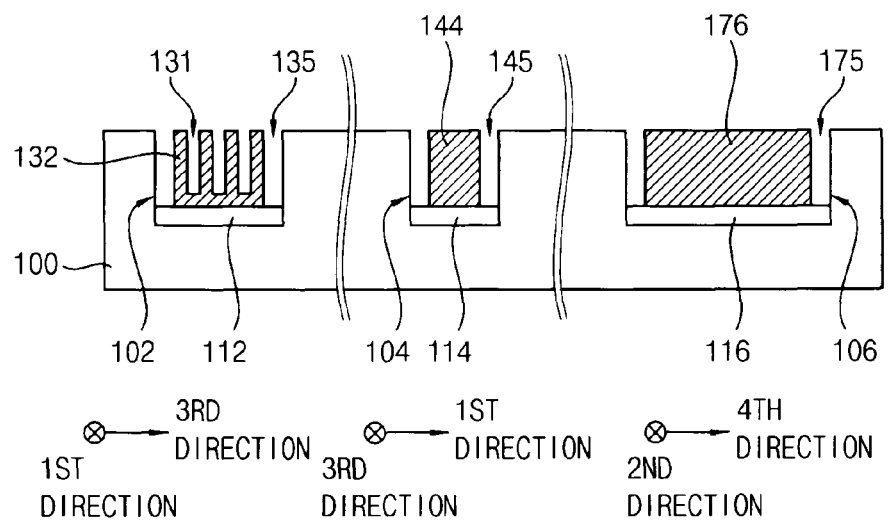
FIGS. 23 to 25 are cross-sectional views illustrating stages of a method of manufacturing an optical integrated circuit in accordance with some example embodiments.
Figure 24:
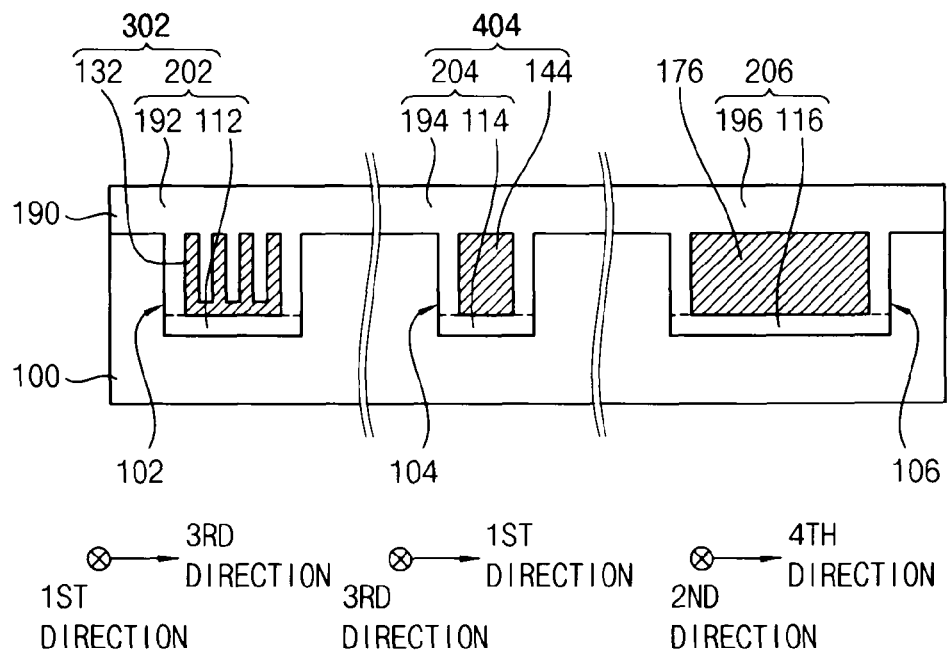
Figure 25:
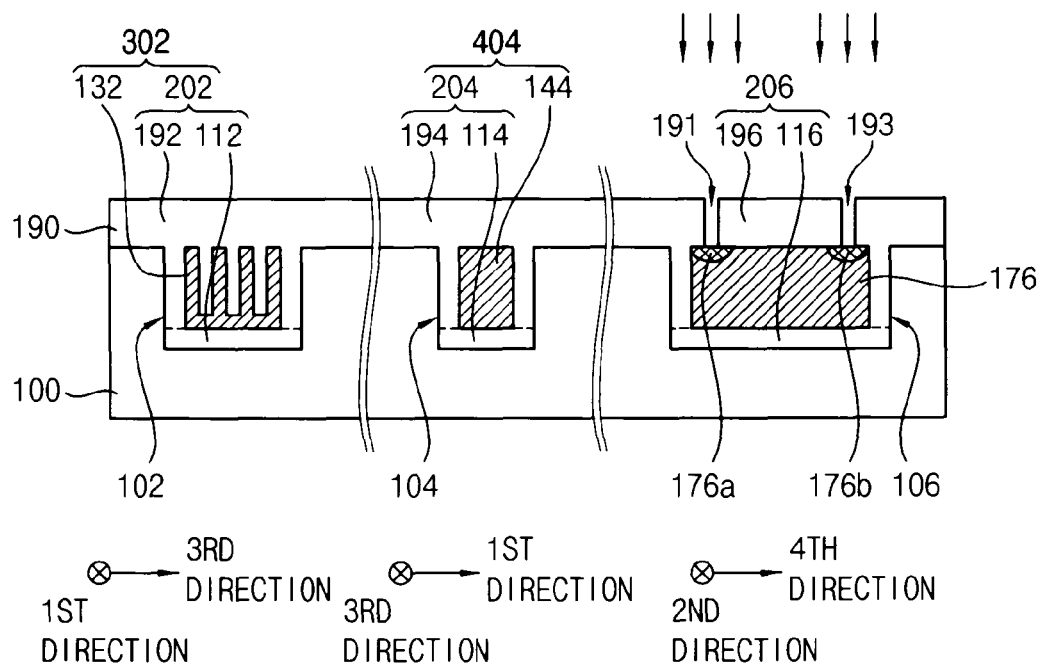

FIGS. 23 to 25 are cross-sectional views illustrating stages of a method of manufacturing an optical integrated circuit in accordance with some example embodiments. This method may be used in manufacturing the optical integrated circuit of FIG. 22, however, may not be limited thereto. Additionally, this method may include processes substantially the same as or similar to those illustrated with reference to FIGS. 3 to 17, and thus like reference numerals refer to like elements, and detailed descriptions thereon are omitted herein.

First, processes substantially the same as or similar to those illustrated with reference to FIGS. 3 to 10 may be performed.

Referring to FIG. 23, processes substantially the same as or similar to those illustrated with reference to FIGS. 11 to 12 may be performed. However, the third single crystalline semiconductor layer pattern 126 may be partially etched to form a seventh core 176.

That is, unlike the fifth core 156, the seventh core 176 may be formed to have a constant thickness. However, the seventh core 176 may be formed to have a width greater than that of the sixth core 166 of FIG. 18. Thus, a ninth opening 175 exposing sidewalls of the third trench 106 and upper edge surfaces of the third insulation layer pattern 116 may be formed. The seventh core 176 may be formed to extend in the second direction substantially parallel to the <110> crystal orientation.

Referring to FIG. 24, processes substantially the same as or similar to those illustrated with reference to FIGS. 13 to 14 may be performed.

Thus, a fourth insulation layer pattern 192 filling the first opening 135 and the recesses 131 and covering top surfaces of the first core 132 and the second core (not shown) may be formed, a fifth insulation layer pattern 194 filling the second opening 145 and covering top surfaces of the third core (not shown) and the fourth core 144 may be formed, and a sixth insulation layer pattern 196 filling the ninth opening 175 and covering a top surface of the seventh core 176 may be formed.

Referring to FIG. 25, processes substantially the same as or similar to those illustrated with reference to FIGS. 15 to 16 may be performed.

Thus, the sixth insulation layer pattern 196 may be partially removed to form fourth and fifth openings 191 and 193 exposing lateral portions of the seventh core 176, and impurities may be implanted into the exposed lateral portions of the seventh core 176 to form fifth and sixth impurity regions 176a and 176b. In some example embodiments, the fifth impurity region 176a may be doped with p-type impurities, and the sixth impurity region 176b may be doped with n-type impurities.

Referring to FIG. 22 again, processes substantially the same as or similar to those illustrated with reference to FIGS. 17 and 2 may be performed.

Thus, plugs 210 filling the fourth and fifth openings 191 and 193 may be formed, and electrodes 220 may be formed on the plugs 210.

The seventh core 176, the third cladding 206, the plugs 210 and the electrodes 220 may form a phase shifter 520.

Figure 26:
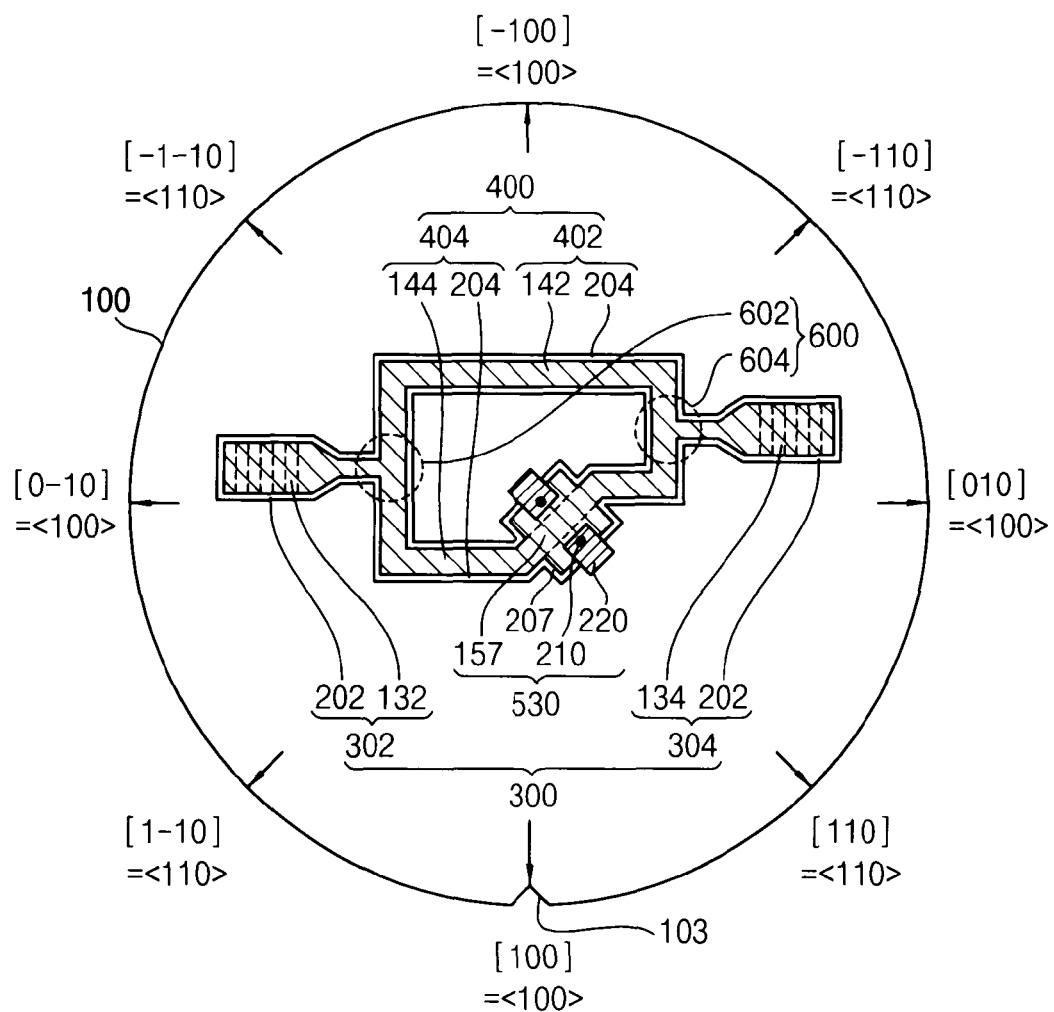
FIG. 26 is a plan view illustrating an optical integrated circuit in accordance with some example embodiments.

FIG. 26 is a plan view illustrating an optical integrated circuit in accordance with some example embodiments. The optical integrated circuit may be substantially the same as or similar to that illustrated with reference to FIGS. 1 and 2, except for the location and extension direction of the phase shifter. Thus, like reference numerals refer to like elements, and detailed descriptions thereon are omitted herein.

Referring to FIG. 26, a phase shifter 530 of the optical integrated circuit may include an eighth core 157, a seventh cladding 207, plugs 210 and electrodes 220.

In some example embodiments, the eighth core 157 may include single crystalline silicon having regrown from amorphous silicon using the {110} crystal plane of the first substrate 100 as a seed. The single crystalline silicon of the eighth core 157 may have crystal defect more than that of the single crystalline silicon of the first to fourth cores 132, 134, 142 and 144.

In some example embodiments, the eighth core 157 may extend in the fourth direction on the first substrate 100 with a given distance. That is, the eighth core 157 may fill an upper portion of the fourth trench (not shown) extending in the fourth direction with a given distance, and thus may extend in the fourth direction.

In some example embodiments, the eighth core 157 may include a central portion and lateral portions when viewed in the fourth direction, and the lateral portions may have a width smaller than that of the central portion. In some example embodiments, the lateral portions may be formed at sides of a lower portion of the central portion. In some example embodiments, seventh and eighth impurity regions (not shown) may be formed in the lateral portions, respectively.

The seventh cladding 207 may include an insulating material having a refractive index lower than that of the eighth core 157. For example, the seventh cladding 207 may include silicon oxide, silicon nitride, silicon carbonitride, etc. As the eighth core 157 extends in the fourth direction, the seventh cladding surrounding the eighth core 157 may extend in the fourth direction with a given distance.

The phase shifter 530 may be connected to the second waveguide 404. In some example embodiments, the phase shifter 530 may be interposed at a central portion of the second waveguide 404. Thus, the phase of the light having passed through the second waveguide 404 may be changed while the light passes through the phase shifter 530, and the light may be incident on the second coupler 304 via the second waveguide 404.

That is, a light incident on the first coupler 302 may be divided into two while the light passes through the first interferometer 602, and the divided two lights may pass through the first and second waveguides 402 and 404, respectively. The phase of the light passing through the second waveguide 404 may be changed while the light passes through the phase shifter 530, however, the phase of the light passing through the first waveguide 402 may not be changed. The two lights may interfere with each other at the second interferometer 604. The interfered light may be transferred via the second coupler 304.

Figure 27:
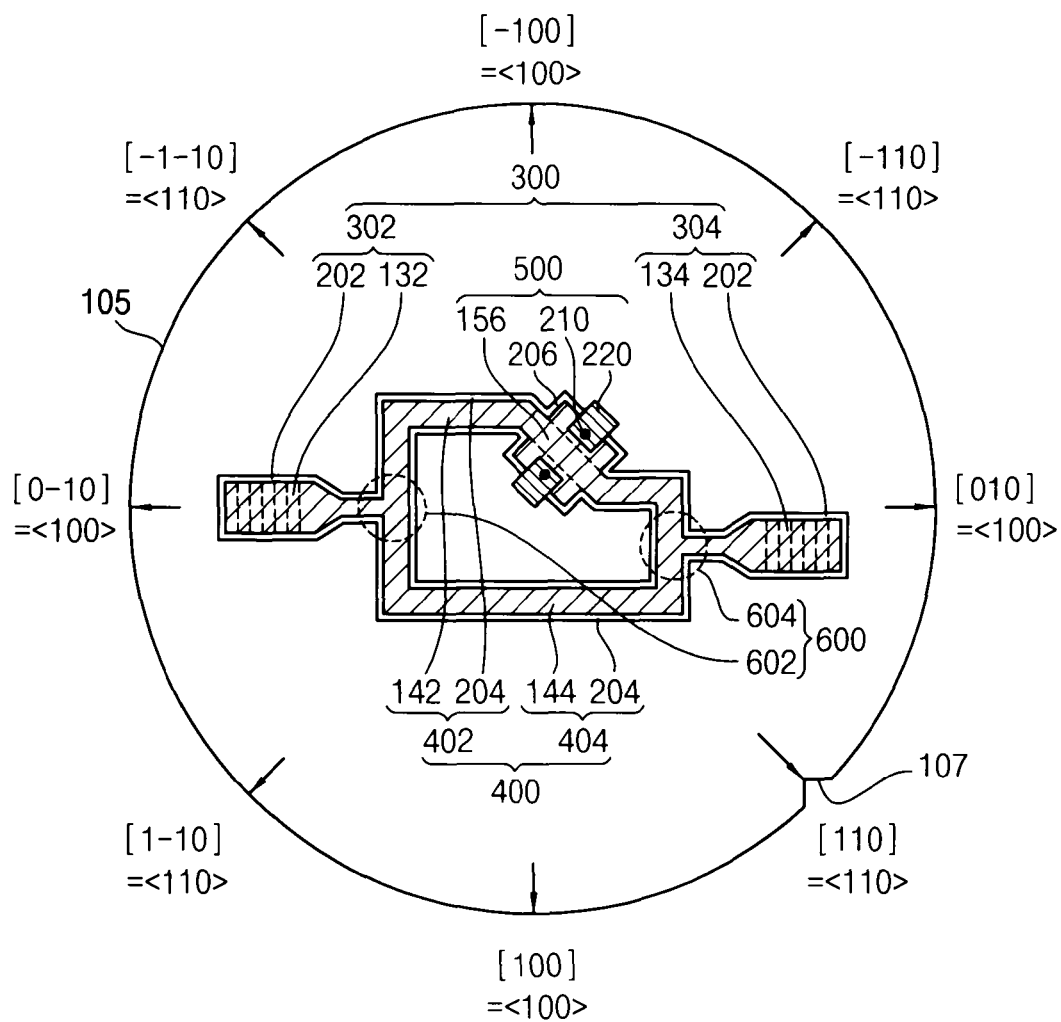
FIG. 27 is a plan view illustrating an optical integrated circuit in accordance with some example embodiments.
Figure 27:
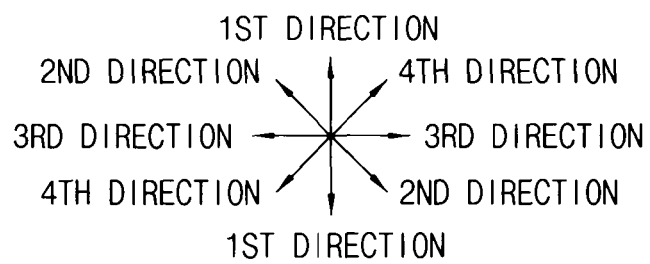

FIG. 27 is a plan view illustrating an optical integrated circuit in accordance with some example embodiments. The optical integrated circuit may be substantially the same as or similar to that illustrated with reference to FIGS. 1 and 2, except for the location and extension direction of the phase shifter. Thus, like reference numerals refer to like elements, and detailed descriptions thereon are omitted herein.

Referring to FIG. 27, the optical integrated circuit may include an optical coupler 300, an optical waveguide 400, a phase shifter 500 and an optical interferometer 600 on a second substrate 105.

In some example embodiments, the second substrate 105 may be a single crystalline silicon wafer. Additionally, a second notch 107 may be formed at an edge of the second substrate 105 in the [110] crystal orientation.

The optical coupler 300, the optical waveguide 400 and the phase shifter 500 may have a construction and extension direction substantially the same as those of the optical integrated circuit of FIGS. 1 and 2.

That is, regardless that the substrate is a (100) single crystalline silicon wafer or a (110) single crystalline silicon wafer, the passive element of the optical integrated circuit may include a single crystalline semiconductor material having a relatively small amount of crystal defect, while the active element of the optical integrated circuit may include a single crystalline semiconductor material having a relatively large amount of crystalline defect. Additionally, in order to realize the above crystal characteristics, the passive element and the active element may have the extension direction substantially the same as those of the optical integrated circuit of FIGS. 1 and 2.

Figure 28:
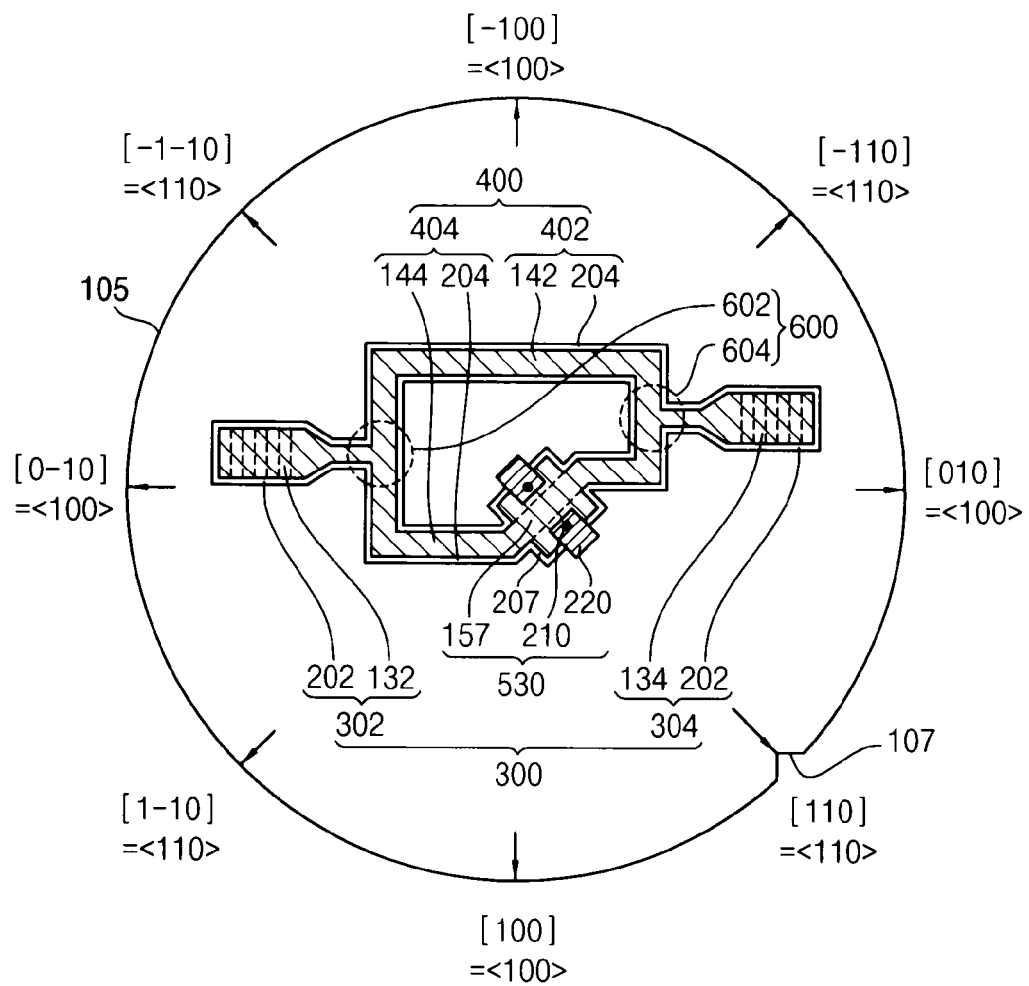
FIG. 28 is a plan view illustrating an optical integrated circuit in accordance with some example embodiments.

FIG. 28 is a plan view illustrating an optical integrated circuit in accordance with some example embodiments. The optical integrated circuit may be substantially the same as or similar to that illustrated with reference to FIG. 27, except for the location and extension direction of the phase shifter. Additionally, the location and extension direction of the phase shifter may be substantially the same as that of the optical integrated circuit illustrated with reference to FIG. 26. Thus, like reference numerals refer to like elements, and detailed descriptions thereon are omitted herein.

Referring to FIG. 28, the optical integrated circuit may include an optical coupler 300, an optical waveguide 400, a phase shifter 530 and an optical interferometer 600 on a second substrate 105.

Figure 29:
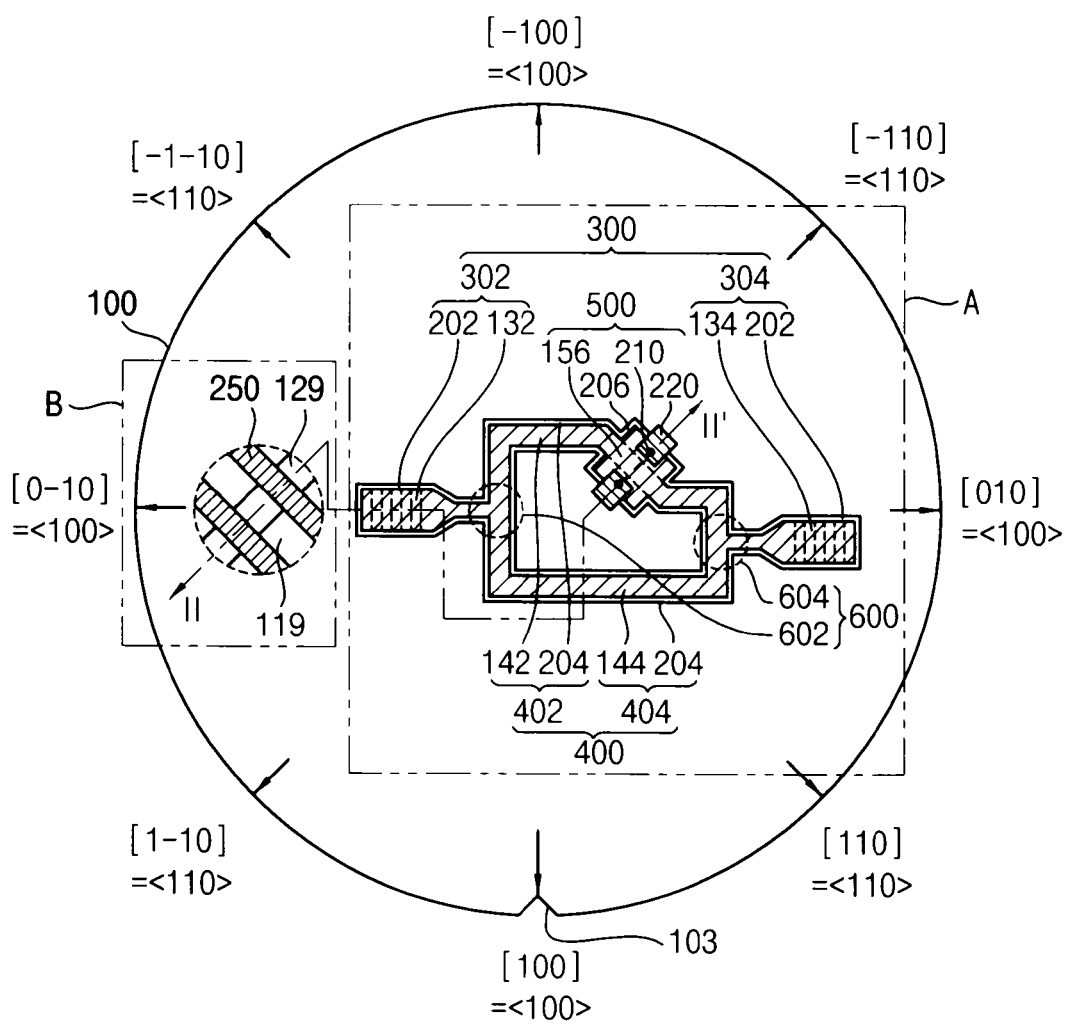
FIG. 29 is a plan view illustrating a semiconductor device having an optical integrated circuit and an electrical integrated circuit in accordance with some example embodiments.
Figure 29:
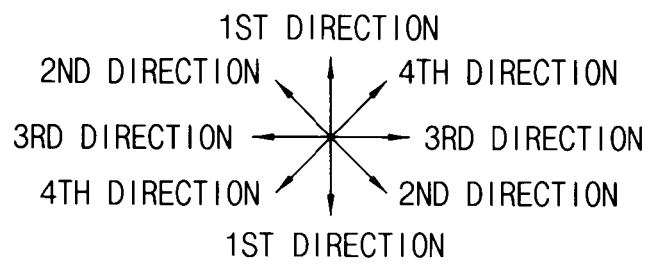
Figure 30:
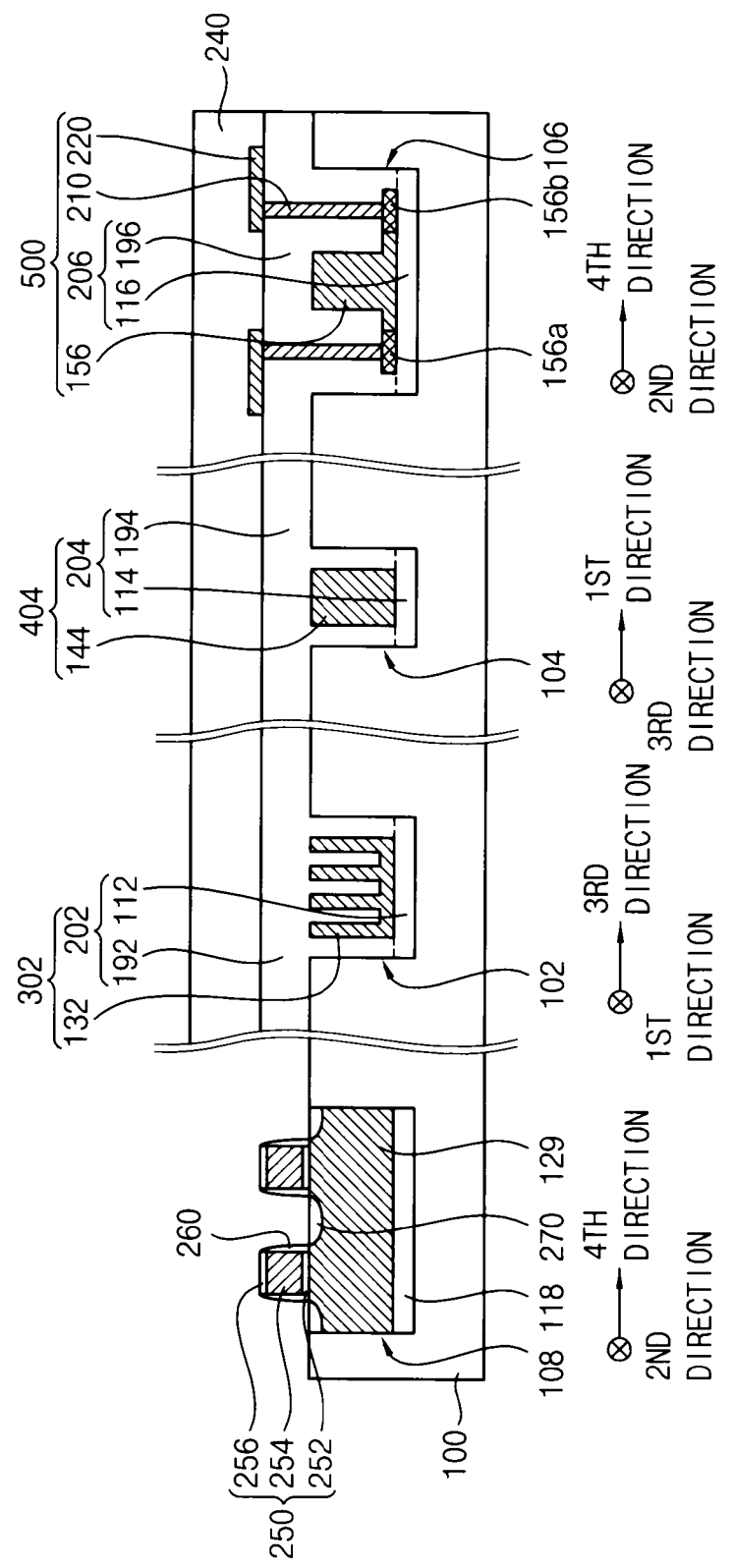
FIG. 30 is a cross-sectional view of the semiconductor device cut along the line II-II' of FIG. 29.

FIG. 29 is a plan view illustrating a semiconductor device having an optical integrated circuit and an electrical integrated circuit in accordance with some example embodiments, and FIG. 30 is a cross-sectional view of the semiconductor device cut along the line II-II' of FIG. 29. The semiconductor device may include the optical integrated circuit substantially the same as or similar to that illustrated with reference to FIGS. 1 and 2. Thus, like reference numerals refer to like elements, and detailed descriptions thereon are omitted herein.

Referring to FIGS. 29 and 30, the optical integrated circuit may be formed on a first substrate 100 in a first region A. The optical integrated circuit may include an optical coupler 300, an optical waveguide 400 and a phase shifter 500.

The electrical integrated circuit of the semiconductor device may be formed on the first substrate 100 in a second region B. In some example embodiments, the electrical integrated circuit may be a transistor including a gate structure 250 on an active layer 129 and an isolation layer pattern 119, a spacer 260 on a sidewall of the gate structure 250, and ninth impurity regions 270 at upper portions of the active layer 129 adjacent to the gate structure 250.

The active layer 129 may include a single crystalline semiconductor material. In some example embodiments, the active layer 129 may include single crystalline silicon having regrown from amorphous silicon with the {110} crystal plane of the first substrate 100 as a seed. The single crystalline silicon may have a relatively large amount of crystal defect.

In some example embodiments, the active layer 129 may extend in the fourth direction on the first substrate 100. That is, the active layer 129 may partially fill an upper portion of a fifth trench 108 extending in the fourth direction with a given distance, and extend in the fourth direction. In some example embodiments, a plurality of active layers 129 may be formed in the second direction.

The isolation layer pattern 119 may surround sidewalls of the active layers 129. In some example embodiments, the isolation layer pattern 119 may include an insulating material, e.g., silicon oxide, silicon nitride, silicon carbonitride, etc.

The gate structure 250 may include gate insulation layer pattern 252, a gate electrode 254 and a gate mask 256 sequentially stacked on the active layer 129 and the isolation layer pattern 119. In some example embodiments, the gate structure 250 may extend in the second direction, and a plurality of gate structures 250 may be formed in the fourth direction.

The gate insulation layer pattern 252 may include, e.g., silicon oxide, the gate electrode 254 may include, e.g., doped polysilicon, metal, metal nitride, metal silicide, etc., and the gate mask may include, e.g., silicon nitride.

The spacer 260 may include, e.g., silicon nitride.

The ninth impurity region 270 may be doped with p-type impurities or n-type impurities. In some example embodiments, the ninth impurity region 270 may serve as source/drain regions of the transistor.

The active layer 129 may have a large amount of crystal defect, and thus the carrier moving a channel between the ninth impurity regions 270 may have good mobility. Thus, the transistor including the active layer 129 may have good electrical characteristics.

FIGS. 31 to 35 are cross-sectional views illustrating stages of a method of manufacturing a semiconductor device including an optical integrated circuit and an electrical integrated circuit. FIGS. 31 to 35 are cross-sectional views cut along the line II-II' of FIGS. 29 and 30. This method may be used in manufacturing the semiconductor device of FIGS. 29 and 30, however, may not be limited thereto. This method may include processes substantially the same as or similar to those illustrated with reference to FIGS. 3 to 17. Thus, like reference numerals refer to like elements, and detailed descriptions thereon are omitted herein.

Figure 31:
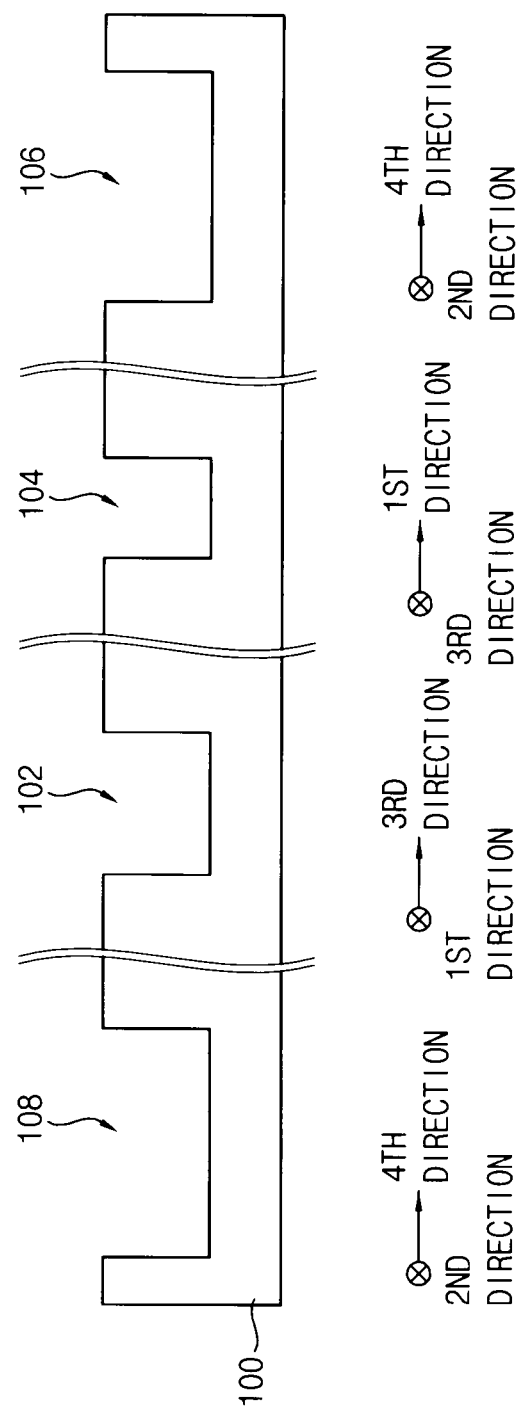
FIGS. 31 to 35 are cross-sectional views illustrating stages of a method of manufacturing a semiconductor device including an optical integrated circuit and an electrical integrated circuit.

Referring to FIG. 31, processes substantially the same as or similar to those illustrated with reference to FIGS. 3 and 4 may be performed.

Particularly, first, second, third and fifth trenches 102, 104, 106 and 108 may be formed on a first substrate 100 including a first region A and a second region B. The first region A may be an optical element region in which an optical integrated circuit may be formed, and the second region B may be an electrical element region in which an electrical integrated circuit may be formed.

The first trench 102 may be formed to extend in the third direction with a first distance, the second trench 104 may be formed to extend in the third and first directions with second and third distances, respectively, the third trench 106 may be formed to extend in the second direction with a fourth distance, and the fifth trench 108 may be formed to extend in the fourth direction with a fifth distance. Thus, the {100} crystal plane, the {100} crystal plane, the {110} crystal plane and the {110} crystal plane of the first substrate 100 may be exposed by the first, second, third and fifth trenches 102, 104, 106 and 108, respectively.

Figure 32:
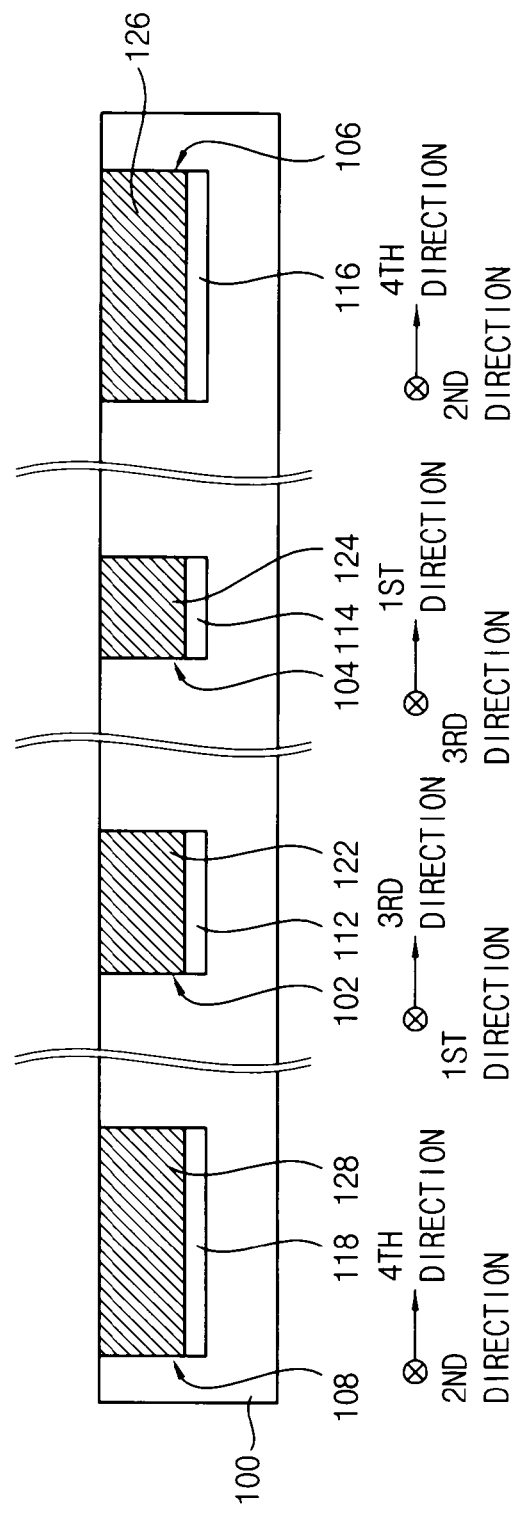

Referring to FIG. 32, processes substantially the same as or similar to those illustrated with reference to FIGS. 5 to 10 may be performed.

Thus, first, second, third and thirteenth insulation layer patterns 112, 114, 116 and 118 may be formed at lower portions of the first, second, third and fifth trenches 102, 104, 106 and 108, respectively.

Additionally, an amorphous semiconductor layer may be formed to fill remaining portions of the first, second, third and fifth trenches 102, 104, 106 and 108, and may be crystallized using portions of the first substrate 100 exposed by the first, second, third and fifth trenches 102, 104, 106 and 108 as a seed to form a single crystalline semiconductor layer. The single crystalline semiconductor layer may be planarized until a top surface of the first substrate 100 may be exposed. Thus, first, second, third and fourth single crystalline semiconductor layer patterns 122, 124, 126 and 128 may be formed at upper portions of the first, second, third and fifth trenches 102, 104, 106 and 108, respectively.

According to the extension directions of the first, second, third and fifth trenches 102, 104, 106 and 108, the first single crystalline semiconductor layer pattern 122 may be formed to extend in the third direction, the second single crystalline semiconductor layer pattern 124 may be formed to extend in the third and first directions, the third single crystalline semiconductor layer pattern 126 may be formed to extend in the second direction, and the fourth single crystalline semiconductor layer pattern 128 may be formed to extend in the fourth direction.

In some example embodiments, the {100} crystal plane, the {100} crystal plane, the {110} crystal plane and the {110} crystal plane of the first substrate 100 may be exposed by the first, second, third and fifth trenches 102, 104, 106 and 108, respectively, and the first, second, third and fourth single crystalline semiconductor layer patterns 122, 124, 126 and 128 that may be formed by a crystallization process using the exposed crystal planes as a seed may regrow in the <100> crystal orientation, the <100> crystal orientation, the <110> crystal orientation and the <110> crystal orientation, respectively. The crystal defect of the first and second single crystalline semiconductor layer patterns 122 and 124 having grown in the <100> crystal orientation may be less than that of the third and fourth crystalline semiconductor layer patterns 126 and 128 having grown in the <110> crystal orientation.

Figure 33:
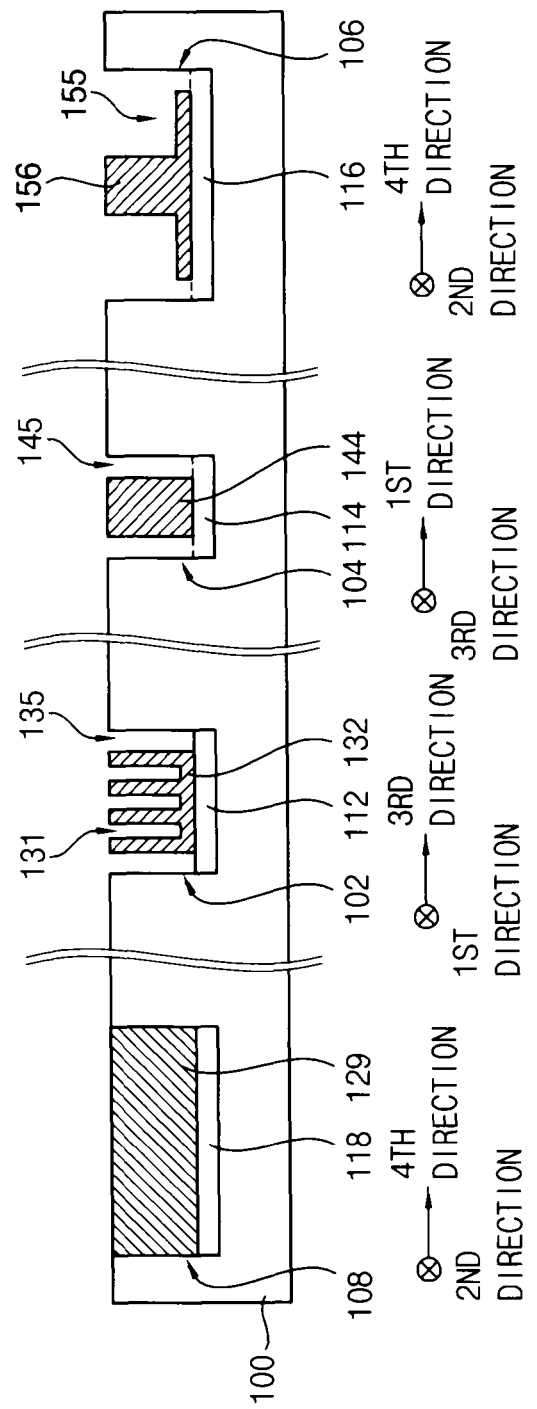

Referring to FIG. 33, processes substantially the same as or similar to those illustrated with reference to FIGS. 11 to 12 may be performed.

Thus, the first, second, third and fourth single crystalline semiconductor layer patterns 122, 124, 126 and 128 may be partially etched to form first, second, third, fourth and fifth cores 132, 134, 142, 144 and 156, and an active layer 129. First, second and third openings 135, 145 and 155 exposing sidewalls of the first, second and third trenches 102, 104 and 106, and upper edge surfaces of the first, second and third insulation layer patterns 112, 114 and 116, respectively, may be formed. Additionally, a tenth opening (not shown) exposing a top surface of the thirteenth insulation layer pattern 118 may be formed. In some example embodiments, the tenth opening may extend in the fourth direction, and a plurality of tenth openings may be formed in the second direction. Recesses 131 may be formed on the first single crystalline semiconductor layer pattern 122, and thicknesses of lateral portions of the third single crystalline semiconductor layer pattern 126 when viewed in the second direction may be reduced.

The first and second cores 132 and 134 may extend in the third direction substantially parallel to the <100> crystal orientation, the third and fourth cores 142 and 144 may extend in the third and first directions substantially parallel to the <100> crystal orientation, the fifth core 156 may extend in the second direction substantially parallel to the <110> crystal orientation, and the active layer 129 may extend in the fourth direction substantially parallel to the <110> crystal orientation.

Figure 34:
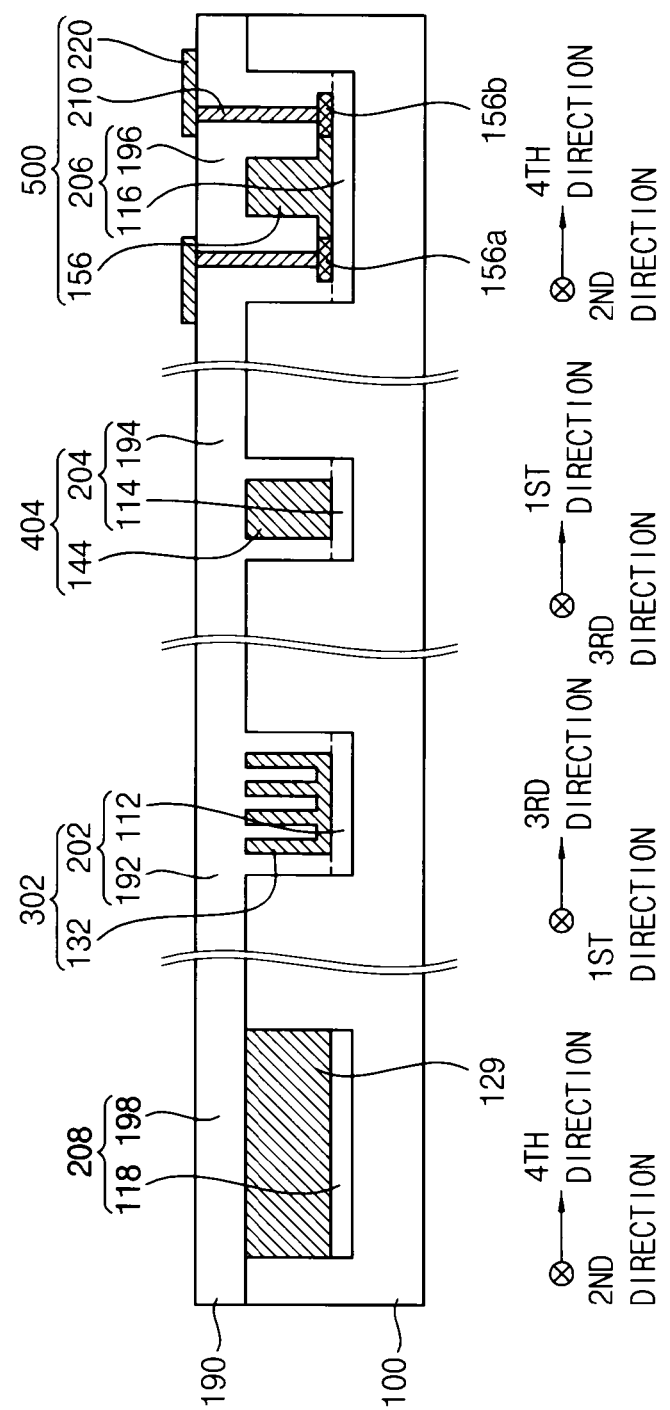

Referring to FIG. 34, processes substantially the same as or similar to those illustrated with reference to FIGS. 13 to 17 and FIG. 2 may be performed.

Thus, the first insulation layer pattern 112 together with a fourth insulation layer pattern 192 thereon may be defined as a first cladding 202, the second insulation layer pattern 114 together with a fifth insulation layer pattern 194 thereon may be defined as a second cladding 204, and the third insulation layer pattern 116 together with a sixth insulation layer pattern 196 thereon may be defined as a third cladding 206. A fourteenth insulation layer pattern 198 may be formed on the active layer 129 and the thirteenth insulation layer pattern 118 (as shown in FIG. 30, for example, active layers 129 may be on thirteenth insulation layer pattern 118; as shown in FIG. 29, for example, isolation layer pattern 119 may surround sidewalls of active layers 129). A sum of the fourth, fifth, sixth and fourteenth insulation layer patterns 192, 194, 196 and 198 may be the second insulation layer 190.

First and second impurity regions 156*a* and 156*b* may be formed at lateral portions of the fifth core 156, plugs 210 may be formed through the sixth insulation layer pattern 196 to contact the first and second impurity regions 156*a* and 156*b*, and electrodes 220 may be formed on the plugs 210.

Figure 35:
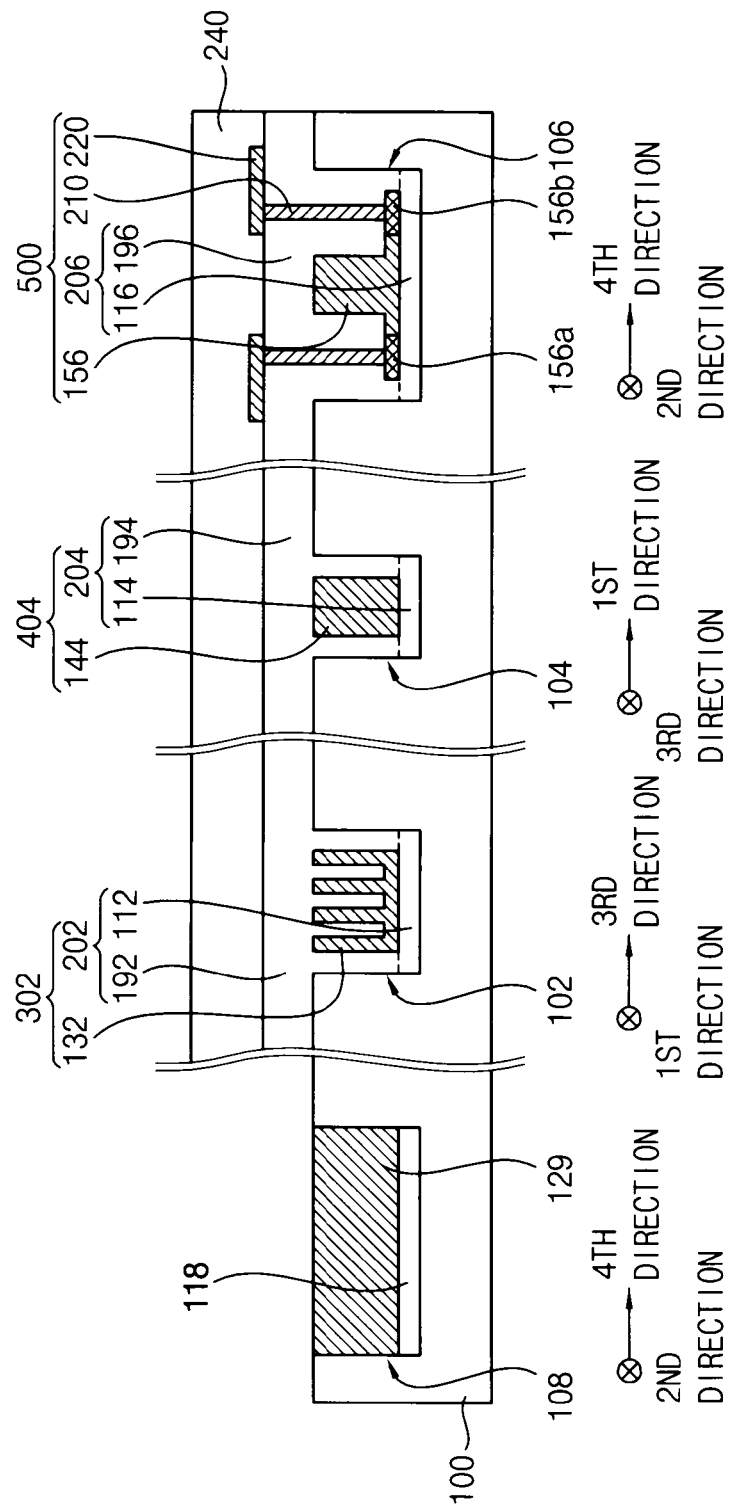

Referring to FIG. 35, a fifth insulation layer 240 may be formed on the second insulation layer 190 to cover the electrodes 220. The fifth insulation layer 240 may include an insulating material, e.g., silicon oxide, silicon nitride, silicon carbonitride, etc.

The fifth insulation layer 240 and the fourteenth insulation layer pattern 198 may be partially removed so that a top surface of the active layer 129 may be exposed in the second region B. Thus, a portion of the fourteenth insulation layer pattern 198 surrounding the active layers 129 may remain, which may be referred to as an isolation layer pattern 119.

Referring to FIGS. 29 and 30 again, a gate structure 250 extending in the second direction may be formed on the exposed active layer 129 and the isolation layer pattern 119, a spacer 260 may be formed on a sidewall of the gate structure 250, and ninth impurity regions 270 may be formed at upper portions of the active layer 129 adjacent to the gate structure 250.

Particularly, a gate insulation layer, a gate conductive layer and a gate mask layer may be sequentially formed on the active layer 129, the isolation layer pattern 119 and the fifth insulation layer 240, and the gate mask layer, the gate conductive layer and the gate insulation layer may be patterned using a fourth photoresist pattern (not shown) to form the gate structure 250 including a gate insulation layer pattern 252, a gate electrode 254 and a gate mask 256 sequentially stacked on the active layer 129 and the isolation layer pattern 119. In some example embodiments, a plurality of gate structures 250 may be formed in the fourth direction.

A spacer layer covering the gate structure 250 may be formed on the active layer 129, the isolation layer pattern 119 and the fifth insulation layer 240, and may be anisotropically etched to from the spacer 260 on the sidewall of the gate structure 250.

Impurities may be implanted into upper portions of the active layer 129 adjacent to the gate structure 250 to form the ninth impurity regions 270. The ninth impurity regions 270 may be doped with p-type or n-type impurities.

The active layer 129 may have a relatively large amount of crystal defect, and thus the carrier moving a channel between the ninth impurity regions 270 may have good mobility. Thus, the electrical integrated circuit including the active layer 129 may have good electrical characteristics.

A semiconductor device including the optical integrated circuit of FIG. 18 and the electrical integrated circuit of FIGS. 29 and 30 or a semiconductor device including the optical integrated circuit of FIG. 22 and the electrical integrated circuit of FIGS. 29 and 30 may be implemented and included in the scope of the present inventive concept.

Figure 36:
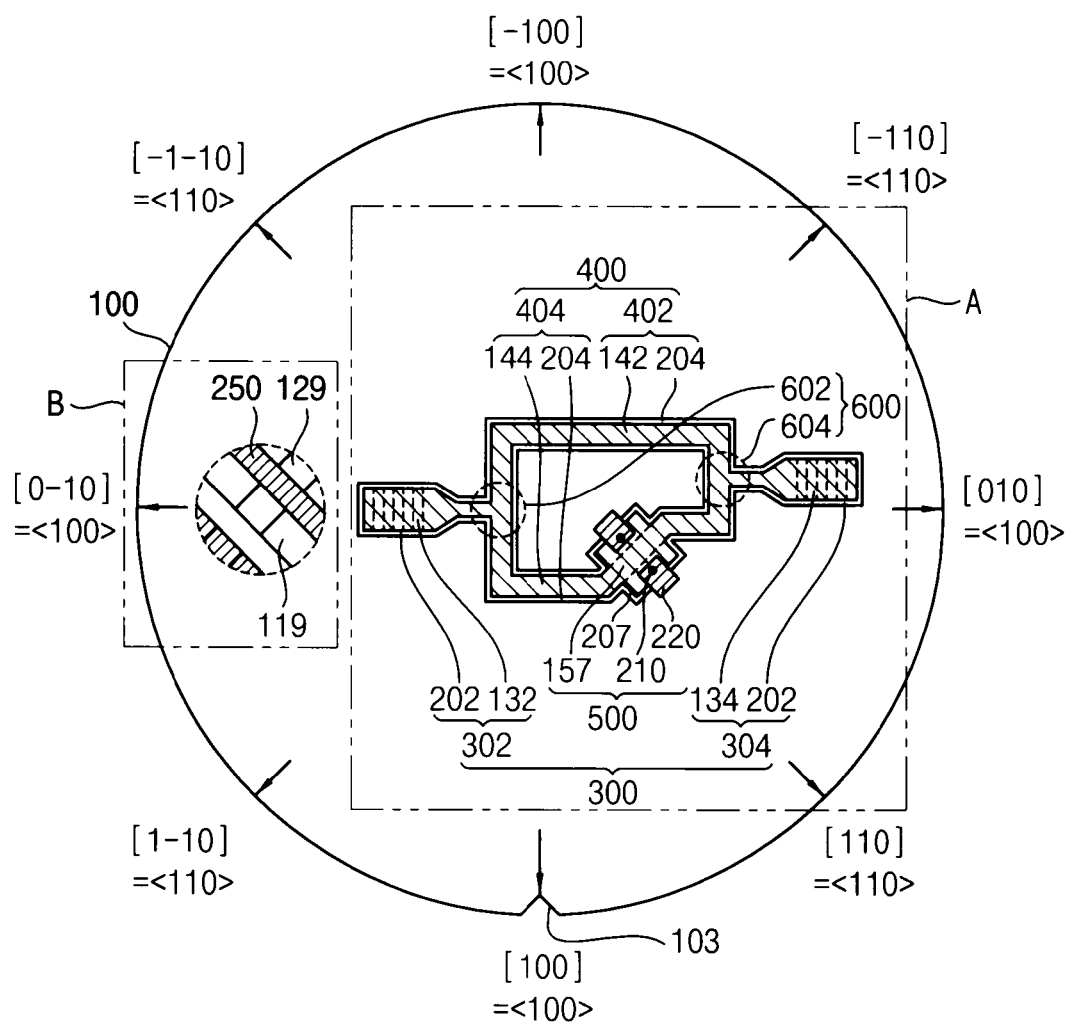
FIG. 36 is a plan view illustrating a semiconductor device having an optical integrated circuit and an electrical integrated circuit in accordance with some example embodiments.
Figure 36:
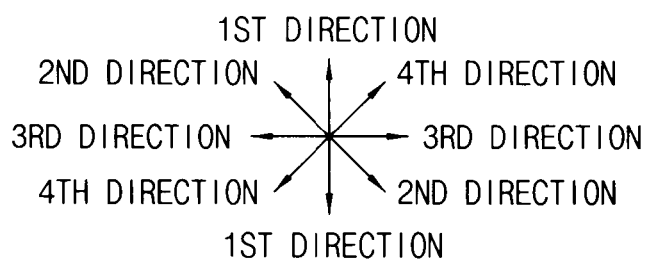

FIG. 36 is a plan view illustrating a semiconductor device having an optical integrated circuit and an electrical integrated circuit in accordance with some example embodiments. The optical integrated circuit may be substantially the same as or similar to that illustrated with reference to FIG. 26, and the electrical integrated circuit may be substantially the same as or similar to that illustrated with reference to FIGS. 29 and 30. Thus, like reference numerals refer to like elements, and detailed descriptions thereon are omitted herein.

Referring to FIG. 36, the optical integrated circuit may be formed on a first substrate 100 in a first region A. The optical integrated circuit may include an optical coupler 300, an optical waveguide 400 and a phase shifter 500.

The electrical integrated circuit of the semiconductor device may be formed on the first substrate 100 in a second region B. The electrical integrated circuit may include a gate structure 250 on an active layer 129 and an isolation layer pattern 119, a spacer 260 on a sidewall of the gate structure 250, and ninth impurity regions 270 at upper portions of the active layer 129 adjacent to the gate structure 250.

Figure 37:
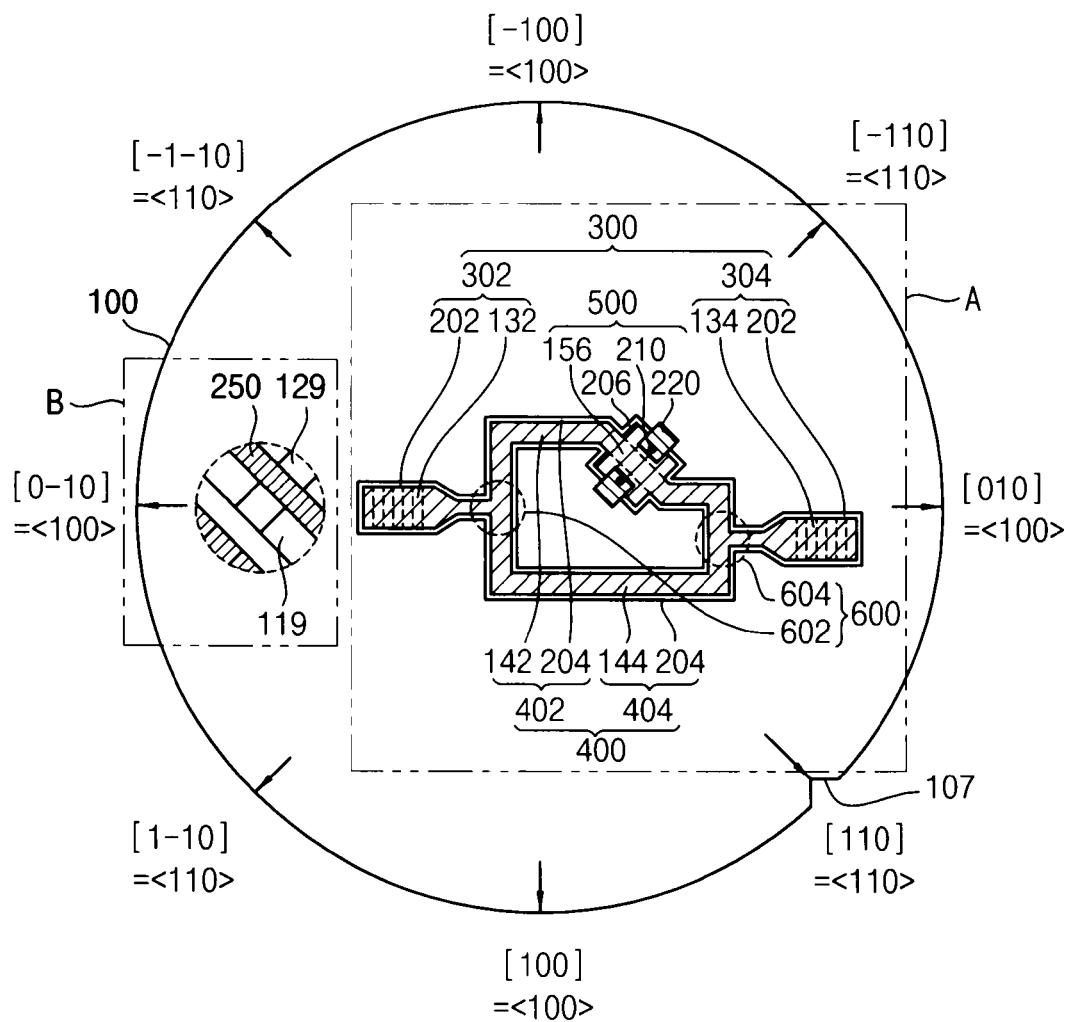
FIG. 37 is a plan view illustrating a semiconductor device having an optical integrated circuit and an electrical integrated circuit in accordance with some example embodiments.
Figure 37:
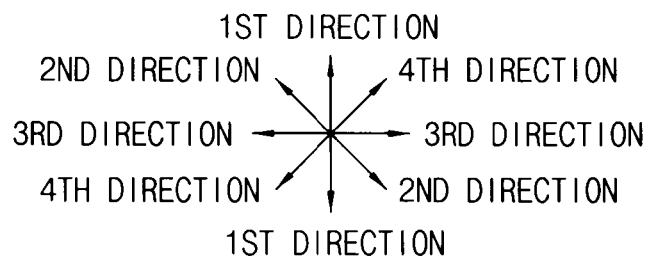

FIG. 37 is a plan view illustrating a semiconductor device having an optical integrated circuit and an electrical integrated circuit in accordance with some example embodiments. The optical integrated circuit may be substantially the same as or similar to that illustrated with reference to FIG. 27, and the electrical integrated circuit may be substantially the same as or similar to that illustrated with reference to FIGS. 29 and 30. Thus, like reference numerals refer to like elements, and detailed descriptions thereon are omitted herein.

Referring to FIG. 37, the optical integrated circuit may be formed on a second substrate 105 in a first region A. The optical integrated circuit may include an optical coupler 300, an optical waveguide 400 and a phase shifter 500.

The electrical integrated circuit of the semiconductor device may be formed on the second substrate 105 in a second region B. The electrical integrated circuit may include a gate structure 250 on an active layer 129 and an isolation layer pattern 119, a spacer 260 on a sidewall of the gate structure 250, and ninth impurity regions 270 at upper portions of the active layer 129 adjacent to the gate structure 250.

Figure 38:
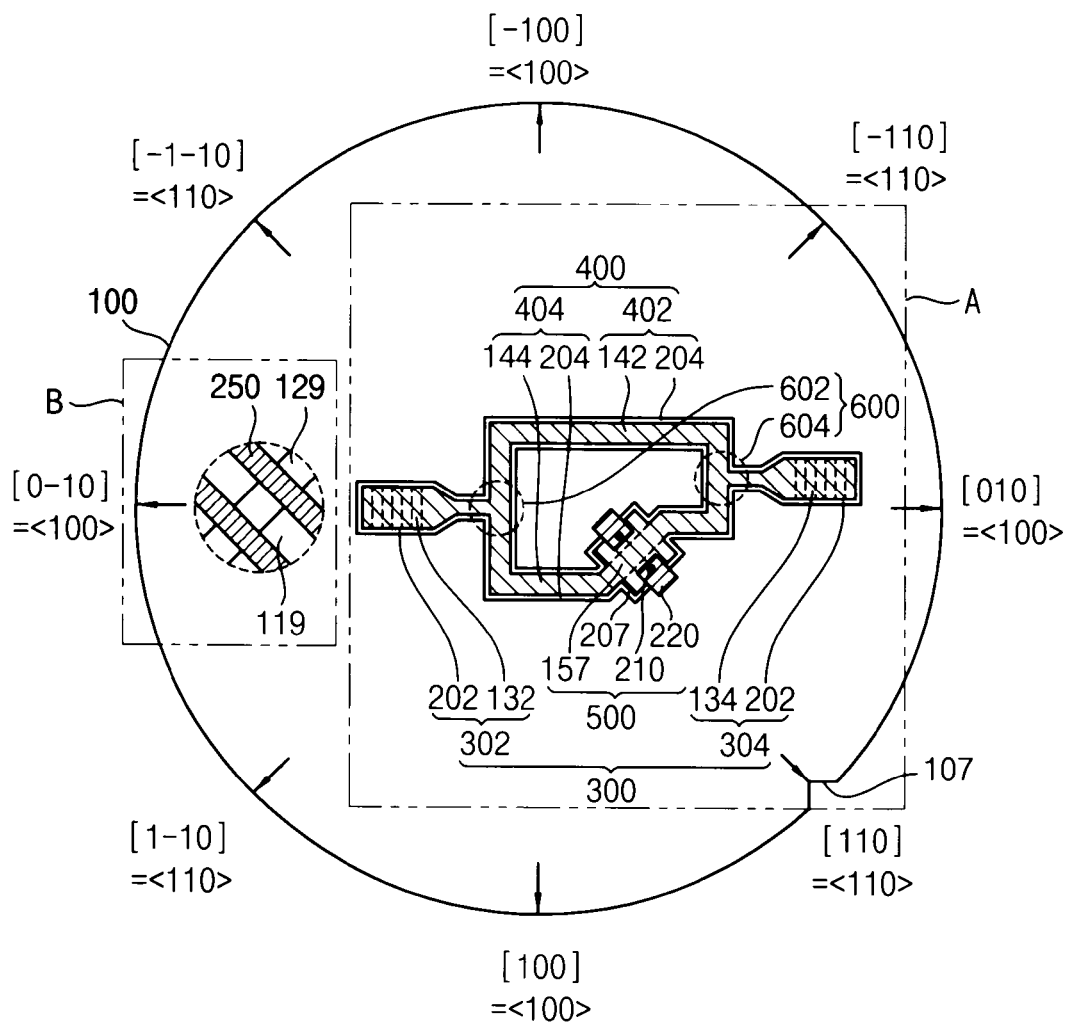
FIG. 38 is a plan view illustrating a semiconductor device having an optical integrated circuit and an electrical integrated circuit in accordance with some example embodiments.
Figure 38:
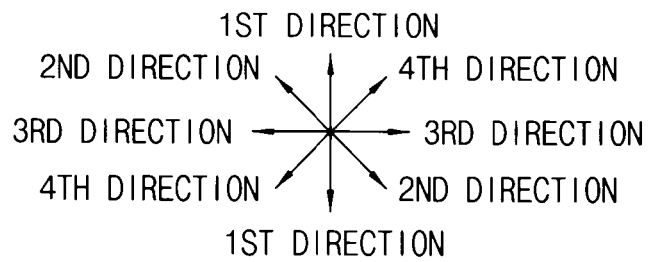

FIG. 38 is a plan view illustrating a semiconductor device having an optical integrated circuit and an electrical integrated circuit in accordance with some example embodiments. The optical integrated circuit may be substantially the same as or similar to that illustrated with reference to FIG. 28, and the electrical integrated circuit may be substantially the same as or similar to that illustrated with reference to FIGS. 29 and 30. Thus, like reference numerals refer to like elements, and detailed descriptions thereon are omitted herein.

Referring to FIG. 38, the optical integrated circuit may be formed on a second substrate 105 in a first region A. The optical integrated circuit may include an optical coupler 300, an optical waveguide 400 and a phase shifter 500.

The electrical integrated circuit of the semiconductor device may be formed on the second substrate 105 in a second region B. The electrical integrated circuit may include a gate structure 250 on an active layer 129 and an isolation layer pattern 119, a spacer 260 on a sidewall of the gate structure 250, and ninth impurity regions 270 at upper portions of the active layer 129 adjacent to the gate structure 250.

The passive element of the optical integrated circuit in accordance with some example embodiments may include a single crystalline semiconductor material having a relatively small amount of crystal defect, and the active element may include a single crystalline semiconductor material having a relatively large amount of crystal defect. Thus, the passive element may have a low loss in the light signal transfer, and the active element may have a high speed in the light signal transfer. The present inventive concept may be applied to any type of optical integrated circuit having the above characteristics, e.g., a ring-type optical shifter instead of Mach Zehnder optical shifter.

Further, the semiconductor device in accordance with some example embodiments may include the electrical integrated circuit, e.g., a transistor together with the optical integrated circuit. The transistor may have a channel including a single crystalline semiconductor material having a relatively large amount of crystal defect, and thus the mobility of the carrier may be enhanced. The semiconductor device may include various types of memory circuits as the electrical integrated circuit.

While example embodiments have been particularly shown and described, it will be understood by those of ordinary skill in the art that various changes in form and details may be made therein without departing from the spirit and scope of the present invention as defined by the following claims.

What is claimed is:

1. An optical integrated circuit, comprising:
a substrate including a single crystalline semiconductor material;
a passive element extending in a <100> crystal orientation of the substrate and including the single crystalline semiconductor material; and
an active element extending in a <110> crystal orientation of the substrate and including the single crystalline semiconductor material.

2. The optical integrated circuit of claim 1, wherein the passive element includes an optical waveguide, and
wherein the active element includes a phase shifter connected to the optical waveguide.

3. The optical integrated circuit of claim 2, wherein the optical waveguide includes:
a first core including the single crystalline semiconductor material and extending in the <100> crystal orientation of the substrate; and
a first cladding having a refractive index lower than that of the first core and surrounding the first core;
and wherein the phase shifter includes,
a second core, including the single crystalline semiconductor material and extending in the <110> crystal orientation, connected to the first core;
a second cladding having a refractive index lower than that of the second core and surrounding the second core; and
an electrode electrically connected to the second core.

4. The optical integrated circuit of claim 2, wherein the passive element further includes an optical coupler connected to the optical waveguide.

5. The optical integrated circuit of claim 2, wherein the optical waveguide includes first and second waveguides, and
wherein the first waveguide is connected to the phase shifter.

6. The optical integrated circuit of claim 1, wherein the substrate is a (100) silicon wafer or a (110) silicon wafer.

7. An optical integrated circuit, comprising:
a substrate including a single crystalline semiconductor material;
a passive element extending on the substrate in a first direction parallel to a top surface of the substrate; and
an active element extending on the substrate in a second direction making an acute angle with the first direction;
wherein the passive element is configured so that light passes through the passive element in the first direction,
wherein the first direction is parallel to a <100> crystal orientation of the substrate, and
wherein the second direction is parallel to a <110> crystal orientation of the substrate.

8. The optical integrated circuit of claim 7, wherein the passive element includes an optical waveguide, including:
a first core including the single crystalline semiconductor material and extending in the first direction; and
a first cladding having a refractive index lower than that of the first core and surrounding the first core;
and wherein the active element includes a phase shifter, including,
a second core, including the single crystalline semiconductor material and extending in the second direction, connected to the first core;
a second cladding having a refractive index lower than that of the second core and surrounding the second core; and
an electrode electrically connected to the second core.

9. An optical integrated circuit, comprising:
a substrate having a <100> crystal orientation and a <110> crystal orientation;
a passive element extending in the <100> crystal orientation and including a single crystalline semiconductor material; and
an active element extending in the <110> crystal orientation and including the single crystalline semiconductor material;
wherein the passive element is configured so that light passes through the passive element in a direction in which the passive element extends.

10. The optical integrated circuit of claim 9, wherein the passive element includes an optical waveguide.

11. The optical integrated circuit of claim 9, wherein the passive element includes an optical coupler.

12. The optical integrated circuit of claim 9, wherein the passive element includes an interferometer.

13. The optical integrated circuit of claim 9, wherein the active element includes a phase shifter.

14. The optical integrated circuit of claim 9, wherein the passive element includes an optical waveguide, and
wherein the passive element further includes an optical coupler connected to the optical waveguide.

15. The optical integrated circuit of claim 9, wherein the passive element includes an optical waveguide, and
wherein the active element includes a phase shifter connected to the optical waveguide.

16. The optical integrated circuit of claim 9, wherein the passive element includes an optical waveguide,
wherein the passive element further includes an optical coupler connected to the optical waveguide, and
wherein the active element includes a phase shifter connected to the optical waveguide.

17. The optical integrated circuit of claim 9, wherein the passive element includes a first optical waveguide, a second optical waveguide, and a first coupler, and
wherein the first optical waveguide, second optical waveguide, and first coupler meet at an interferometer.

18. The optical integrated circuit of claim 9, wherein the passive element includes a first optical waveguide, a second optical waveguide, and a first coupler,
- wherein the active element includes a phase shifter connected to the optical waveguide, and
- wherein the first optical waveguide, second optical waveguide, and first coupler meet at an interferometer.

19. The optical integrated circuit of claim 9, wherein the passive element includes a first optical waveguide, a second optical waveguide, a first coupler, and a second coupler,
- wherein the first optical waveguide, second optical waveguide, and first coupler meet at a first interferometer, and
- wherein the first optical waveguide, second optical waveguide, and second coupler meet at a second interferometer.

\* \* \* \* \*